(12) United States Patent
Emokpae et al.

(10) Patent No.: US 11,913,897 B2
(45) Date of Patent: Feb. 27, 2024

(54) FLUID PROPERTY SENSOR AND FLUID PARTICLE SENSOR

(71) Applicant: FluidInsight Ltd., Edmonton (CA)

(72) Inventors: Patrick Emokpae, Devon (CA); David Rutledge, Edmonton (CA); Richard Helfmann, Calgary (CA); Terry Greeniaus, Edmonton (CA); Chris Holt, Edmonton (CA); Mohammad Abdolrazzaghi, Edmonton (CA); Brad Hesson, Sherwood Park (CA); Richard Hull, Calmar (CA); Kenny Xu, Calmar (CA); Arunkumar Sundaram, Edmonton (CA)

(73) Assignee: FluidInsight Ltd., Edmonton (CA)

( * ) Notice: Subject to any disclaimer, the term of this patent is extended or adjusted under 35 U.S.C. 154(b) by 176 days.

(21) Appl. No.: 17/155,590

(22) Filed: Jan. 22, 2021

(65) Prior Publication Data
US 2021/0231597 A1    Jul. 29, 2021

Related U.S. Application Data

(60) Provisional application No. 62/965,298, filed on Jan. 24, 2020.

(51) Int. Cl.
| | |
|---|---|
| *G01N 27/22* | (2006.01) |
| *G01N 27/02* | (2006.01) |
| *G01N 30/02* | (2006.01) |

(52) U.S. Cl.
CPC ......... *G01N 27/227* (2013.01); *G01N 27/028* (2013.01); *G01N 30/02* (2013.01); *G01N 2030/025* (2013.01)

(58) Field of Classification Search
CPC .... G01N 27/227; G01N 27/028; G01N 30/02; G01N 2030/025; G01N 15/0656; G01N 27/023; G01N 27/22
See application file for complete search history.

(56) References Cited

U.S. PATENT DOCUMENTS

| | | | |
|---|---|---|---|
| 3,262,052 A | * | 7/1966 | Fuhs .................. H05H 1/0006 73/861.11 |
| 6,377,052 B1 | | 4/2002 | McGinnis et al. |

(Continued)

FOREIGN PATENT DOCUMENTS

| | | | |
|---|---|---|---|
| CN | 205786203 U | * | 12/2016 |
| WO | 2018067169 A1 | | 4/2018 |

OTHER PUBLICATIONS

L. Svilainis et al., "Amplitude and phase measurement in acquisition systems", ISSN 1392-1223 MATAVIMAI. 2006. Nr.2(38), 6 pages.

(Continued)

*Primary Examiner* — Alexander Satanovsky
*Assistant Examiner* — Asm Fakhruddin
(74) *Attorney, Agent, or Firm* — Maier & Maier, PLLC

(57) ABSTRACT

A method, system and apparatus for sensing fluids. A fluid sensor is configured to analyze a fluid utilizing impedance spectroscopy. Capacitive impedance of fluids is sensed and measured. Inductive impedance of suspended particles in fluids is measured. An electrochemical fingerprint of the properties of the fluid or of the particles within the fluid is generated. Fluid analytics data is generated from sensor signal data of the fluids under test. Trainable artificial intelligence algorithms are used to generate fluid analytics data.

5 Claims, 16 Drawing Sheets

(56) References Cited

U.S. PATENT DOCUMENTS

| | | | |
|---|---|---|---|
| 6,578,416 B1* | 6/2003 | Vogel | G01F 23/265 |
| | | | 73/304 C |
| 7,043,402 B2 | 5/2006 | Phillips et al. | |
| 7,581,434 B1 | 9/2009 | Discenzo et al. | |
| 8,952,708 B2 | 2/2015 | Nikolenko | |
| 9,816,945 B2 | 11/2017 | Feldman et al. | |
| 10,260,388 B2 | 4/2019 | Potyrailo et al. | |
| 2003/0222656 A1* | 12/2003 | Phillips | G01N 27/02 |
| | | | 324/605 |
| 2008/0220535 A1* | 9/2008 | LeBoeuf | G01N 27/414 |
| | | | 436/164 |
| 2012/0242328 A1* | 9/2012 | Ukai | G01N 15/0656 |
| | | | 324/200 |
| 2019/0317152 A1 | 10/2019 | Ballantine et al. | |
| 2019/0376926 A1 | 12/2019 | Tarasov | |

OTHER PUBLICATIONS

V. Dumbrava et al., "The Automated Complex Impedance Measurement System", Electronics and Electrical Engineering, 2007. Nr.4(76), 5 pages.

Jean Jacquelin, "Regressions et Equations Integrales", 2014, pp. 21-36, 85 pages.

Josef Stoer et al., "Introduction to Numerical Analysis", Springer 2nd Edition. 24-25., 1993, 8 pages.

J. M. (https://scicomp.stackexchange.com/users/127/j- m), Evaluating sine and cosine of an integer multiple of an angle, URL (version: Sep. 1, 2017): https://scicomp.stackexchange.com/q/7193 3 pages.

Keysight Technologies, "Impedance Measurement Handbook, A Guide to Measurement Technology and Techniques", 6th Edition, https://literature.cdn.keysight.com/litweb/pdf/595 0-3000.pdf 153 pages.

International Search Report and Written Opinion dated Apr. 26, 2021 in International Application No. PCT/IB2021/050543; 13 pages.

* cited by examiner

SECTION A-A

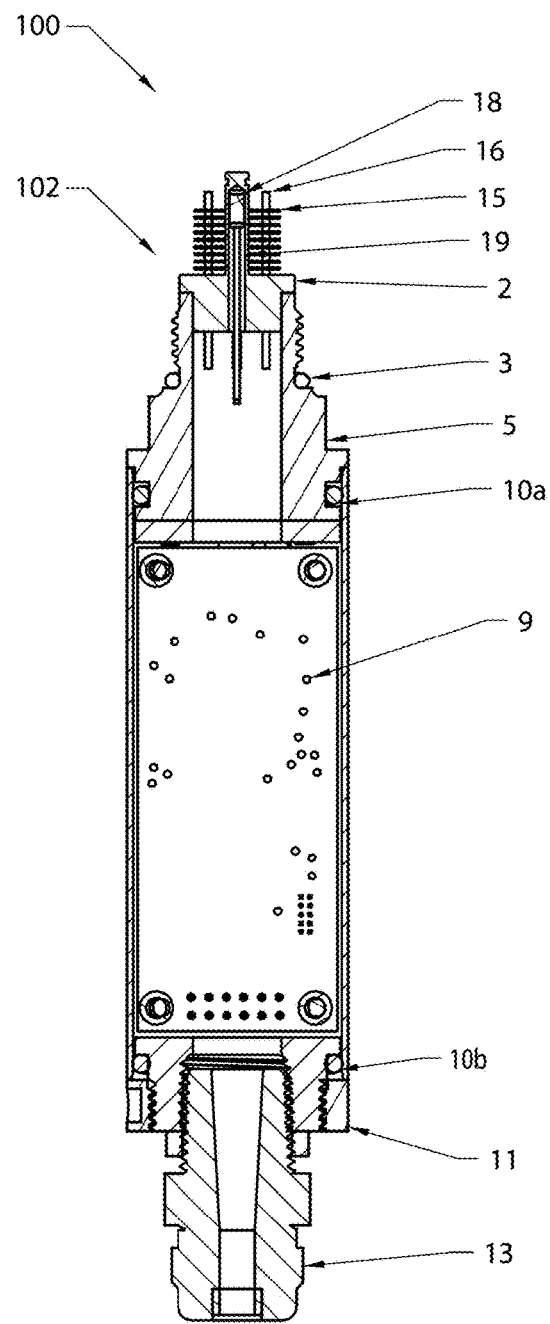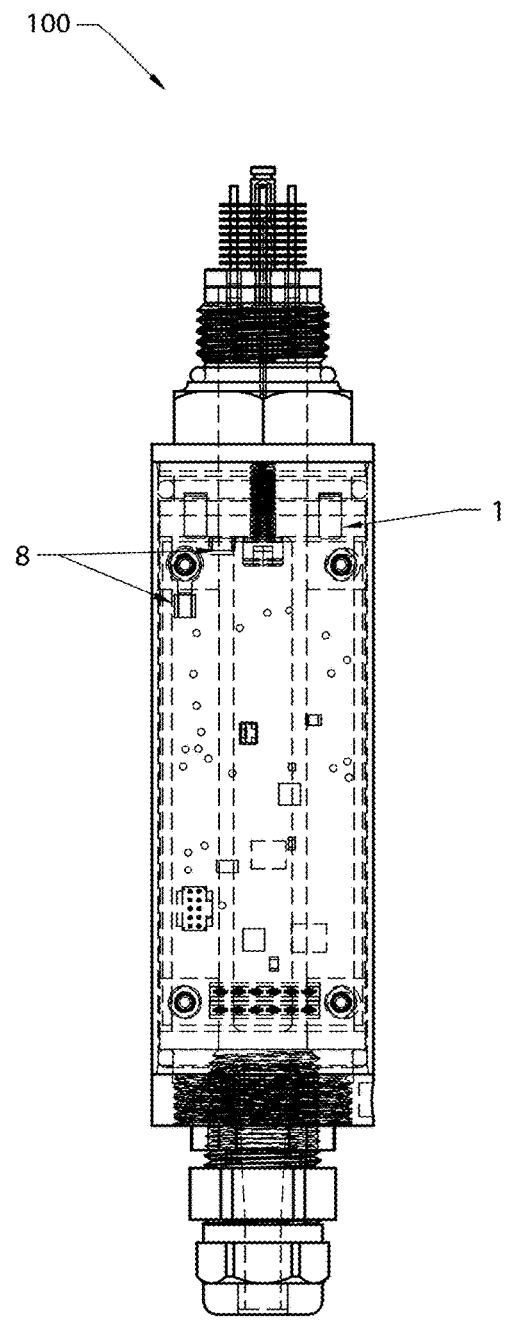
SECTION B-B
Fig. 6c
Fig. 6d

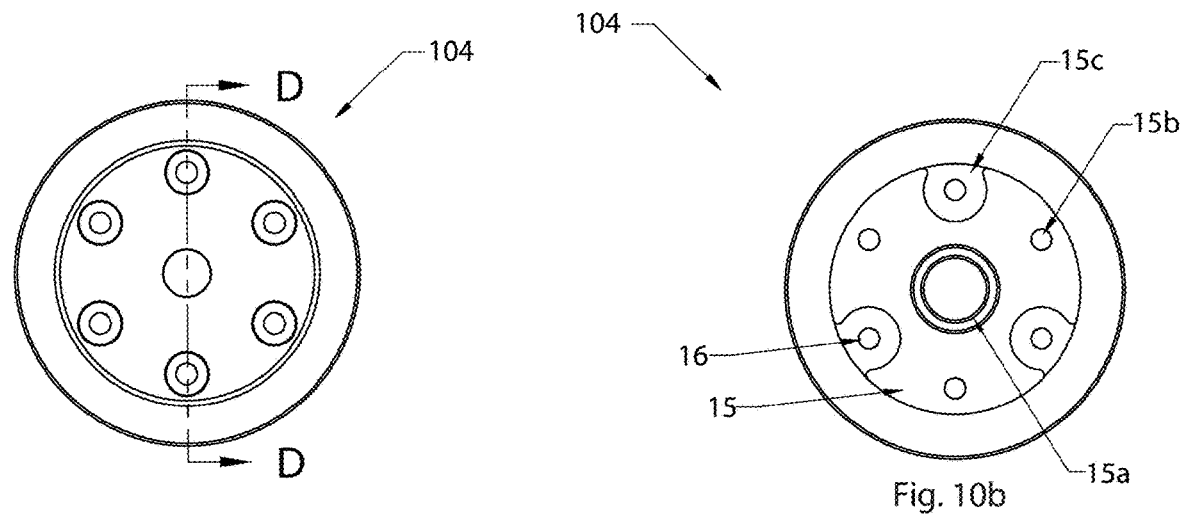
Fig. 10a
Fig. 10b
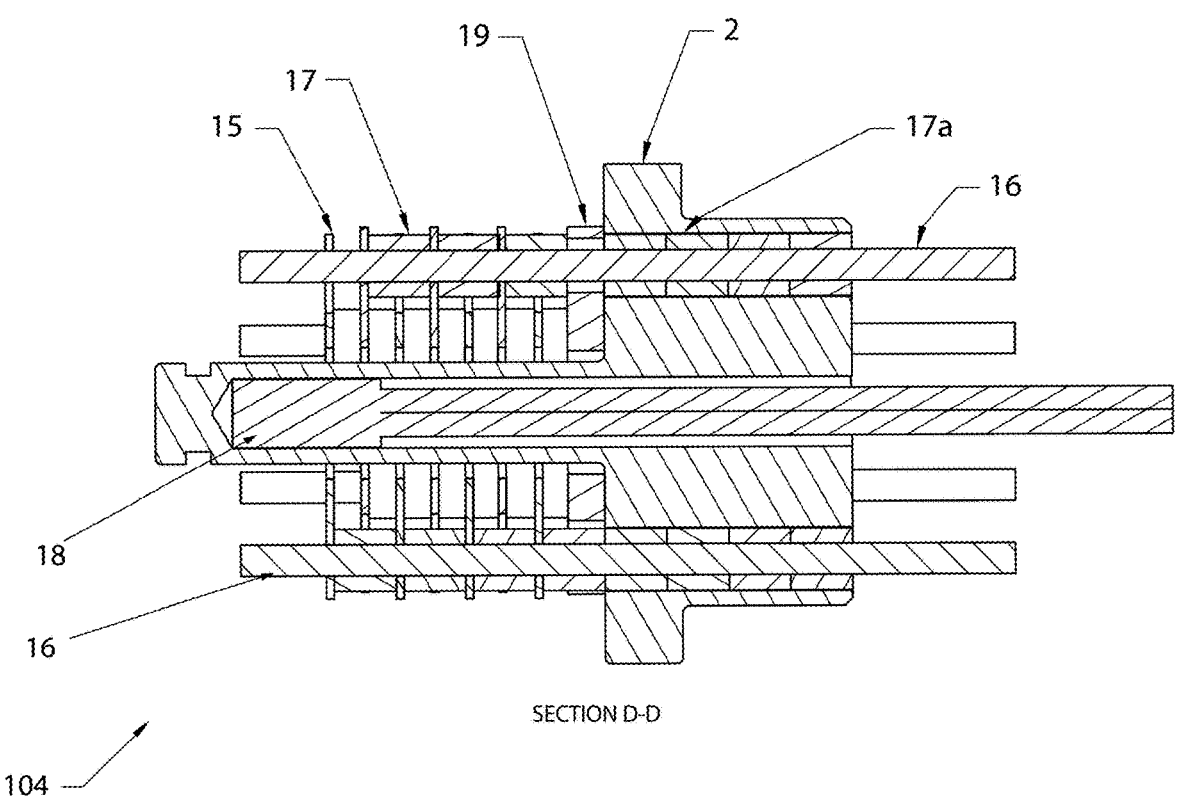
SECTION D-D
Fig. 10c

FLUID PROPERTY SENSOR AND FLUID PARTICLE SENSOR

CROSS-REFERENCE TO RELATED APPLICATIONS

This application claims priority to U.S. Provisional Application 62/965,298, filed Jan. 24, 2020 and entitled "FLUID PROPERTY SENSOR AND FLUID PARTICLE SENSOR", the entire contents of which are hereby incorporated by reference.

BACKGROUND

Real time insight into properties of fluids utilized in industrial and biomedical applications provides the ability to make critical decisions in various situations, such as assessment of drinking water quality, effectiveness of blending and mixing processes for fluids in industries, assessment of quality of raw materials used in industries, assessment of degradation of machinery fluids used to maintain and assist machineries, such as metalworking fluids, lubricants, gear oil, etc., assessment of actual dosing value of a medical drugs in central intravenous lines, and so forth. Laboratory analysis with methods like ICP-AES (Inductively Coupled Plasma-Atomic Emission Spectroscopy), gas chromatography, FTIR (Fourier Transform Infrared) is the status quo for analyzing and providing insight into the fluids.

Laboratory analysis with methods like ICP-AES (Inductively Coupled Plasma-Atomic Emission Spectroscopy), gas chromatography, FTIR (Fourier Transform Infrared) is the present state of the art for analyzing and providing insight into the fluids. Such a process typically involves several steps. Manual samples of fluid under test are taken from the field and shipped to a laboratory. The laboratory uses analytical chemistry methods, some of which are approved by ASTM standards to provide a report of the analysis. The report is then used for inference and decision making.

However, several disadvantages and limitations are present in the known analysis process. Depending on the method, used this process may require several days to several weeks to be completed. The laboratory analyses of fluids are performed on small samples that may only represent as little as 0.001% of the fluid in the system (e.g., 100 ml sample from a 140 L-capacity tank). In certain situations, such an infinitesimal, manual oil sample size is too small to be practical or representative.

Manual lubricant samples, taken minutes apart from the same reservoir, can relay drastically different information. For example, in the case of wear debris, a manual lubricant sample taken at a certain point in time may not register a bearing issue that takes place several hours later. Another common point of failure in conventional fluid analysis is contamination of sampling bottles. A sample taken from a contaminated bottle will often lead to inaccurate and misleading laboratory results.

Furthermore, in many situations, samples can be mislabeled with any combination of the following: wrong sample date, wrong sample time, wrong system that was sampled, wrong asset that was sampled, and so forth. A common sampling issue is human error in the shipment or storage of samples. Incorrectly sealed samples can compromise or even destroy samples (i.e., spills during shipment). Samples can also be compromised or destroyed prior to shipment to laboratories, if they are improperly sealed, stored at inappropriate temperatures, or stored in direct sunlight.

Laboratory fluid analysis often relies on inference of issues, based on isolated snapshots. For example, in laboratory lubricant analysis, suspicion of coolant leaks is often the result of conjecture. This conjecture is based on the presence of trace amounts of certain elements in ICP-AES analysis. Another common misconception is that parts per million (ppm) is an actual count of the number of particles in a sample. For example, using Inductively Coupled Plasma-Atomic Emission Spectroscopy (ICP-AES), a small lubricant sample (e.g., 100 ml) is exposed to energy and the wavelength of the light emitted is measured to determine the elements present (e.g., iron, lead, aluminum, etc.) in the sample. This method requires all the individual atoms in the sample to be excited (i.e., exposed to energy). Consequently, the sample must be completely vaporized to enable measurement of all the atoms in the sample. Such a vaporization and analysis are only possible for particles smaller than 5 microns.

Different methods of obtaining laboratory fluid analysis, even those approved as ASTM standards, contain limitations. For instance, gas chromatography has extremely high resolution, but requires detailed prior knowledge of a fluid's chemical composition. Fourier Transform Infrared (FTIR) Spectroscopy uses absorption or emission spectral data to fingerprint samples, but lacks the precision that EIS is capable of in classifying fluids. Even different ASTM sub-standards, of the same ASTM core standard, can lead to significantly different laboratory results.

Laboratory analysis is subject to statistically significant variance, from one facility to another, owing to factors such as differences in laboratory equipment, differences in human interpretation of experiment results by lab technicians, differences in standard operating procedures, environmental differences between laboratories, differences in calibration procedures, differences in which ASTM standard each laboratory decides to follow, etc. Laboratory analysis is subject to statistically significant variance, even within the same facility, due to factors such as differences in interpretation of standard operating procedures, human error during chemical analysis of samples, human error in recording of laboratory results, human error in storage of samples at laboratories, etc.

For some fluid analysis applications, sensors exist that are based on LCR impedance measurement, or vibration measurement. Such sensors are tailor-made and calibrated to sense the quantity of one or several key components that are specific to that application. This renders such sensors capable of providing fluid analysis and/or insights based on the measurements sensed. Such sensors may include impedance sensors to provide the measure of fat in milk, impedance sensors to detect degradation of industrial fluids based on their thermal and oxidative breakdown, impedance sensors to provide the measure of chlorine and bromine disinfectants, vibration sensors to sense acoustic signatures are used to infer potential issues that may be related to particle evolution in systems such as gearboxes and engines, etc.

Such sensors have to be replaced or constantly updated if the fluids they are adapted to sense are replaced with a more preferred fluid at the field of application. For example, if the lubricant that is being sensed for degradation is replaced with a different model that has newly formulated detergent additives, the sensor must be replaced as well. Furthermore, such sensors do not provide a complete insight into the fluid. Multiple sensors are needed to measure the quantity of various different components. For example, a water treatment facility may need a chlorine sensor, fluoride sensor, biomass sensor, etc., Due to these disadvantages, the laboratory analysis is often preferred.

Accordingly, it is an objective of the embodiments disclosed herein to overcome the disadvantages of the prior art.

SUMMARY

According to at least one exemplary embodiment, a fluid property sensor and a fluid particle sensor (collectively, "fluid sensor" or "the fluid sensors") are disclosed. The fluid property sensor may be configured to analyze a fluid and to provide a high-resolution signal by using electrochemical impedance spectroscopy (EIS). The fluid may be, for example, water, a lubricant, an industrial fluid (e.g., base stock used to make pharmaceuticals, or a base stock used to make petroleum products, for example unrefined hydrocarbons), or a biological fluid. The fluid property sensor may be adapted to perform a complete EIS spectrum sweep over a large span of frequencies. The resultant EIS signals provide an electrochemical fingerprint of the unique chemical properties of a particular fluid. The sensor uses signal processing to convert raw output into high resolution sensor data. This data is then cross-referenced with a reference library, which may be a proprietary library, that utilizes machine learning algorithms to correlate analytical chemistry with the high resolution EIS data. The unique electrochemical properties of any fluid can be determined based on the reaction of the fluid to discrete amounts of electrical stimulation at various frequencies. The response of the fluid is characterized by the phase and magnitude of the electrical response at various frequencies. These unique electrochemical properties provide a unique fingerprint for a fluid, which is then added to the reference library with the aid of sophisticated deep learning algorithms. The fluid property sensor disclosed herein utilizes EIS to provide nondestructive, highly sensitive spectra for electrochemical analysis. With thorough and consistent analysis of the spectra provided by electrochemical impedance measurement sensors, EIS can be applied to areas ranging from analytical and physical chemistry applications to localized impedance microscopies.

The fluid particle sensor may be configured to use magnetic induction spectroscopy (MIS) to detect and analyze microscopic metallic particles within a fluid. The fluid may be, for example, water, a lubricant, an industrial fluid (e.g., base stock used to make pharmaceuticals, or a base stock used to make petroleum products, for example unrefined hydrocarbons), or a biological fluid. As metallic particles flow through a sensor, the fluid particle sensor can interpret the electromagnetic induction field to determine the type of metallic particle, the size of the particle, and the exact time that the particle travels through the electromagnetic induction field. The fluid particle sensor disclosed herein utilizes MIS to provide nondestructive, highly sensitive spectra for electrochemical analysis. With thorough and consistent analysis of the spectra provided by electrochemical impedance measurement sensors, MIS can be applied to areas ranging from analytical and physical chemistry applications to localized impedance microscopies.

The electrochemical properties of any fluid can be deciphered through the reaction of the fluid to discrete amounts of electrical simulation at different frequencies. The response of the fluid is characterized by the phase and magnitude shifts of the current at various applied frequencies of AC voltage, for example in the range of 0.01 Hz to 100 kHz. Such quantified electrochemical reactions of known fluids under various physical conditions, for example, viscosity, pressure, color, temperature, flow rate, and so forth, are systematically obtained and added as fingerprints to a training database. This training database may then be used to train artificial intelligence models. These models may then be applied to further signals from the sensor so as to provide fluid analysis. The artificial intelligence models can be trained to analyze factors such as time of measurement, frequency of the applied voltage, impedance as described by the phase and magnitude shifts, and physical conditions of the fluid such as temperature and pressure.

For example, FIG. 1 shows the distribution of impedance values for various frequencies due to presence of barium. More specifically, the figure shows the relationship of the real part versus the imaginary part of the measured complex impedance Z for various applied frequencies for various barium concentrations. Consequently, a pattern in impedance depending on the concentration of elements in a mixture may be observed. Such patterns may be used to train the artificial intelligence models.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 6b is a cross-sectional view along line A-A of FIG. 6a.

FIG. 6c is a cross-sectional view along line B-B of FIG. 6a.

FIG. 6d is a plan view of the sensor of FIG. 6a showing internal components.

FIG. 9d is a cross-sectional view along line C-C of FIG. 9a.

FIG. 10a is a rear view of an exemplary embodiment of a sensing unit of a fluid property sensor.

FIG. 10b is a front view of the exemplary embodiment of a sensing unit of a fluid property sensor.

FIG. 10c is a cross-sectional view along line D-D of FIG. 10a.

FIG. 11b is a perspective view of the embodiment of FIG. 11a.

FIG. 12b is an exploded view of the embodiment of FIG. 12a.

DETAILED DESCRIPTION

Aspects of the invention are disclosed in the following description and related drawings directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
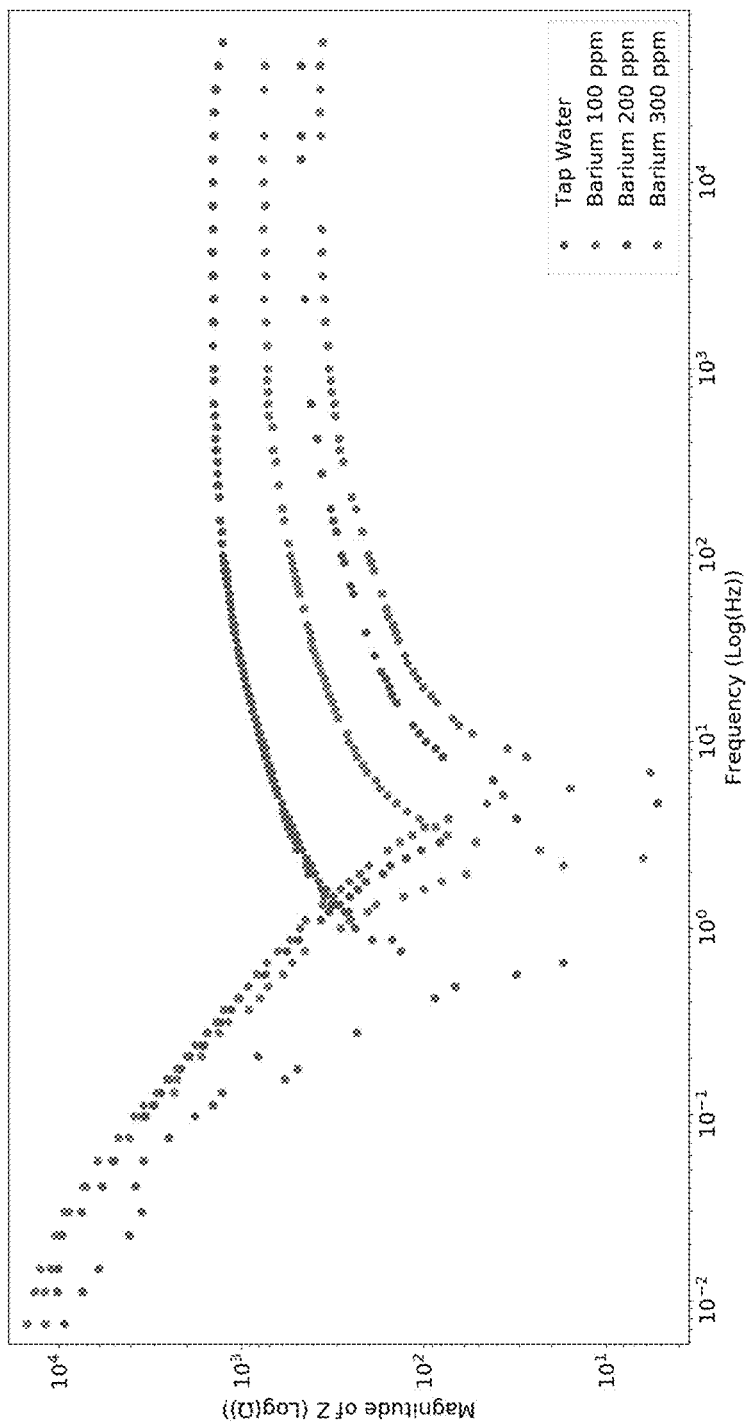
FIG. 1 is an exemplary plot showing a distribution of impedance values for various frequencies due to presence of barium.
Figure 2:
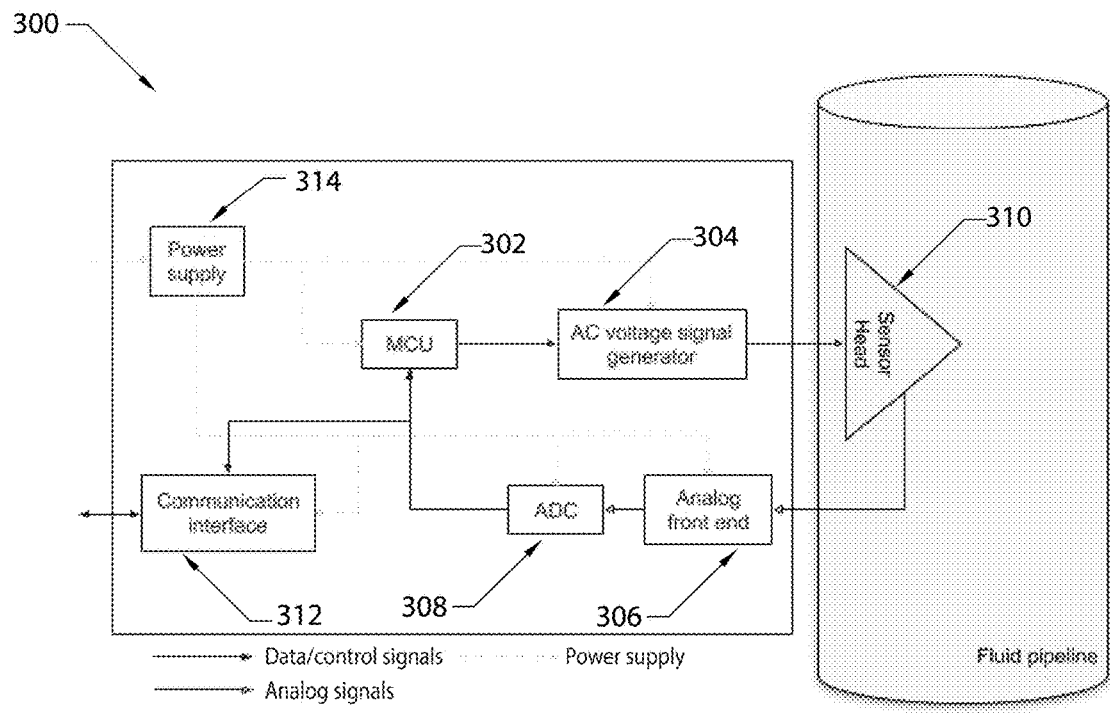
FIG. 2 is a diagram of an exemplary embodiment of a fluid sensor.

According to at least one exemplary embodiment, as shown in FIG. 2, a fluid sensor 300 such as a fluid property sensor or a fluid particle sensor is disclosed. The fluid sensor 300 can include a microcontroller unit (MCU) 302, an AC voltage signal generator 304, and a sensor head 310. The fluid sensor 300 can further include an analog front end 306, an analog-to-digital converter (ADC) 308, a communication interface 312 and a power supply 314.

The MCU 302 may be multifunctional and can be used to process raw digital signals from ADC 308 to provide impedance measurement, to control other onboard peripherals, and to communicate with external entities. The signal generator 304 may be controlled by MCU 302 to generate AC voltage signals of various frequencies, for example, within the range of 0.01 Hz to 100 kHz, so as to excite sensor head 310. Analog front end 306 may be controlled by MCU 302 so as to amplify and condition weak current signals such that they may be sampled by the ADC 308 during use. Communication interface 312 may be used to communicate impedance measurement reference data to be stored by external data collection services, while power supply 314 may provide electrical power to MCU 302 and other onboard components.

Sensor head 310 may include a first set of components for the fluid property sensor and a second set of components for the fluid particle sensor. In the fluid property sensor, sensor head 310 may include one or more resistance temperature detectors and one or more pairs of electrodes to measure capacitive impedance of the fluid. The pair of electrodes may include a driving electrode and a sensing electrode. In the fluid particle sensor, sensor head 310 may include one or more resistance temperature detectors and one or more inductive coils disposed around a fluid pipeline to measure inductive impedance of the fluid.

Figure 3:
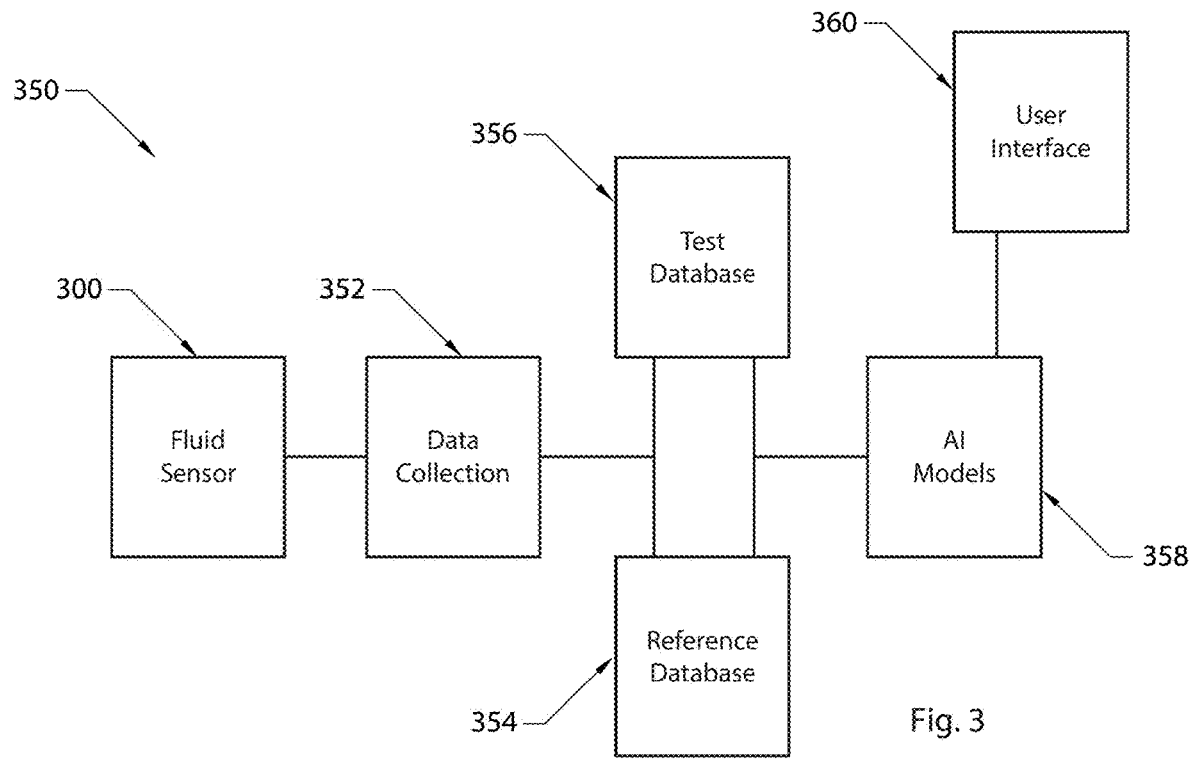
FIG. 3 is a diagram of an exemplary embodiment of a system for sensing fluids.

According to at least one exemplary embodiment, as shown in FIG. 3, a system 350 for sensing fluids is disclosed. System 350 can include fluid sensor 300, data collection services 352, reference fluid sensor data database 354, testing databases 356, trainable AI models 358, and user interface 360. The fluid sensor is adapted to perform a complete EIS or MIS spectrum sweep over a large span of frequencies to characterize the capacitive impedance or the inductive impedance of the fluid, respectively. The resultant EIS signals, collected for the range of applied voltage signal frequencies, provide an electrochemical fingerprint of the unique chemical properties of a particular fluid while the resultant MIS signals provide an electromagnetic induction fingerprint of the type and density of the metallic particles in the fluid. All known metallic particles may be tested for. The sensor 300 may utilize signal processing to convert raw output into high resolution sensor data tagged with the time of signal capture.

Data collection services 352 may be computer-implemented programs or processes, stored on a non-transitory computer-readable medium and executable by a processor. Data collection services 352 can function to collect data from sensors at various locations and store the data in reference fluid sensor data database 354 and/or other organized permanent database entities 356. The databases 354, 356 may also be stored on non-transitory computer-readable media, or any other media that enable system 350 to function as described herein. The reference fluid sensor data database 354 can store processed sensor output data obtained by sensing reference fluids.

Trainable AI models 358 may be algorithms adapted for machine learning. Data from reference fluid sensor data database 354 may be used to train the AI models 358. AI models 358 trained with data from reference database 354 may be used to provide analysis of the fluids-under-test.

In an exemplary method for sensing fluid properties, the MCU 302 may control the voltage signal generator 304 to generate AC voltage signals of various frequencies, for example, within the range of 0.01 Hz to 100 KHz. The AC voltage signals from generator 304 may excite a driving electrode of sensor head 310. Signals from the sensing electrode and the resistance temperature detectors of sensor head 310 may be sent to analog front end 306, where the signals can be amplified and sent to ADC 308. Signals from ADC 308 can be sent both to MCU 302 for processing so as to provide impedance measurements, and concurrently or subsequently to communication interface 312 for external processing and/or storage.

In a further exemplary method for determining fluid properties, data collection services 352 may receive data from communication interface 312 of sensor 300. The data may include the electrochemical fingerprint and/or electromagnetic induction fingerprint of the fluid being analyzed. If a reference fluid is being analyzed, data collection services can send the data, to reference database 354. AI models 358 may then be trained based on the fingerprint and on the additional data provided to AI models 358 for training. Additional information measured and provided for AI model training may include: the type and concentration of metallic particles; the type and concentration of non-metallic particles; the composition of the prepared fluid being tested; the viscosity of the fluid; the pressure endured by the fluid; the flow rate of the fluid; the temperature of the fluid; and the color of the fluid.

Figure 4A:
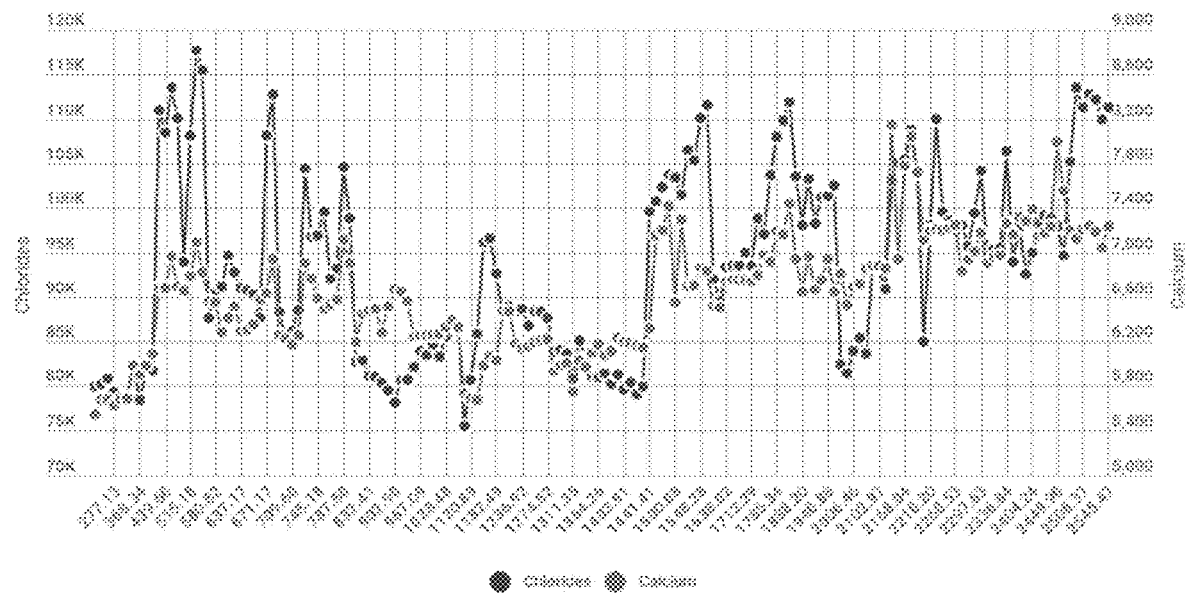
FIG. 4a is an exemplary plot showing a quantity over time of chlorides and calcium in a fluid-under-test.
Figure 4B:
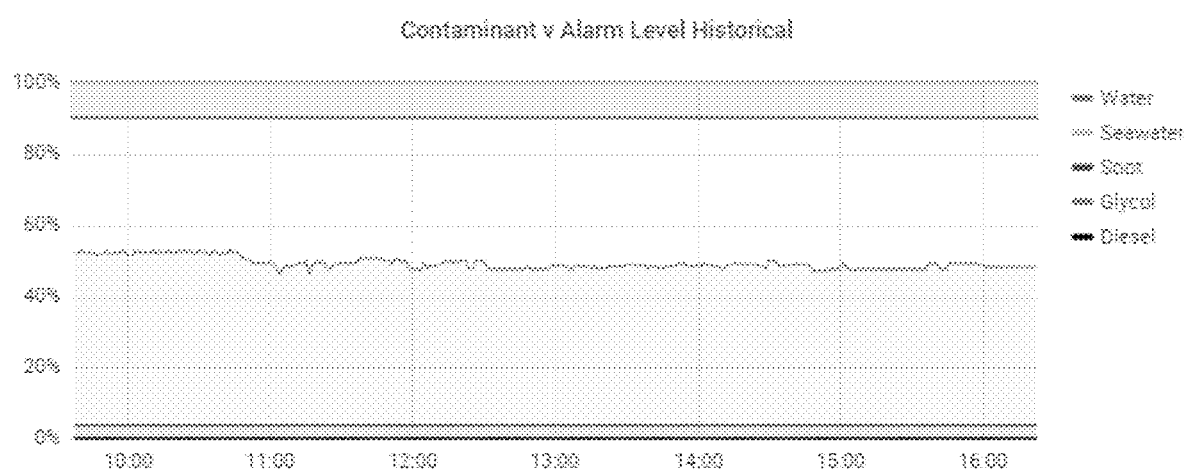
FIG. 4b is an exemplary plot showing a quantity over time of various contaminants in a fluid-under-test.

If a fluid-under-test is being analyzed, the data may be stored in one or more testing databases 356 and may further be sent to AI models 358. AI models 358 may then analyze data from the fluid-under-test by comparing said data to data stored in reference database 354. Aspects of fluids that are analyzed by the models may include the fluid fingerprint, the time of measurement, frequency of the applied voltage, impedance as described by phase and magnitude shifts, and physical conditions of the fluid such as temperature and pressure. Interface 360 may then provide results of the fluid analysis to a user, for example by displaying the results on a display device. An exemplary display of the quantity over time of chlorides and calcium in a fluid-under-test is shown in FIG. 4a. An exemplary display of the quantity over time of various contaminants in a fluid-under-test is shown in FIG. 4b.

Measurement Techniques

The fluid property sensor and the fluid particle sensor (collectively, "the fluid sensors") may perform a measurement of the complex impedance of the fluid-under-test over a range of frequencies. The fluid sensors can inject a sine wave via the driving electrode and then measure the change in that sine wave's amplitude and phase at the sensing electrode. According to at least one exemplary embodiment, an exemplary hardware configuration for performing the measurement and exemplary signal processing for characterizing the frequency response at the sensing electrode are disclosed. For the fluid property sensor, the impedance exhibited due to the capacitance of the fluid across the sensor head electrodes is measured. For the fluid particle sensor, the impedance exhibited due to the inductance of the metallic particles in the sensor head inductive loop is measured.

Figure 5A:
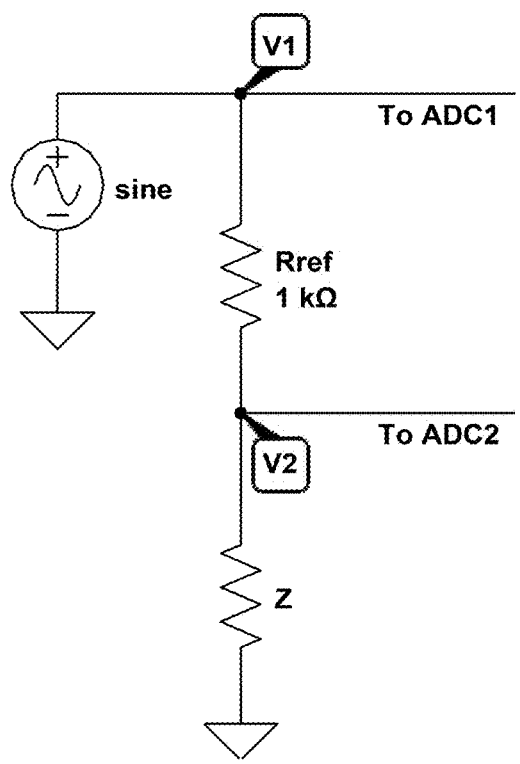
FIG. 5a is an exemplary diagram of a circuit for an I-V measurement technique.

The fluid sensors may perform frequency measurements in the range of 0.04 Hz-100 kHz. For the range of interest, an I-V measurement technique or an auto-balancing bridge technique may be used. The I-V measurement technique can measure the current through a reference resistor that is wired in series with the sensor electrodes, as shown in FIG. 5a. Given the voltages $V_1$ and $V_2$ (which are measured by an ADC or an instrumentation op-amp), and the value of the reference resistor $R_{ref}$, the current through the test impedance may be calculated:

$$I = \frac{V_1 - V_2}{R_{ref}} \quad (1)$$

Now, the unknown impedance may be calculated:

$$Z = \frac{V_2}{I} = \frac{V_2 R_{ref}}{V_1 - V_2} \quad (2)$$

Figure 5B:
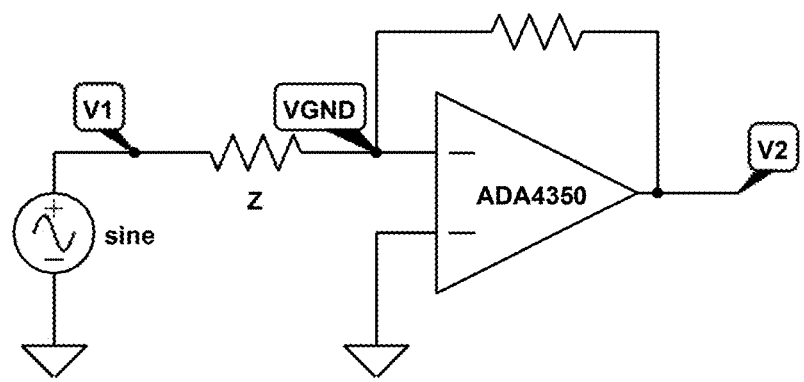
FIG. 5b is an exemplary diagram of a circuit for an auto-balancing bridge technique.
Figure 6A:
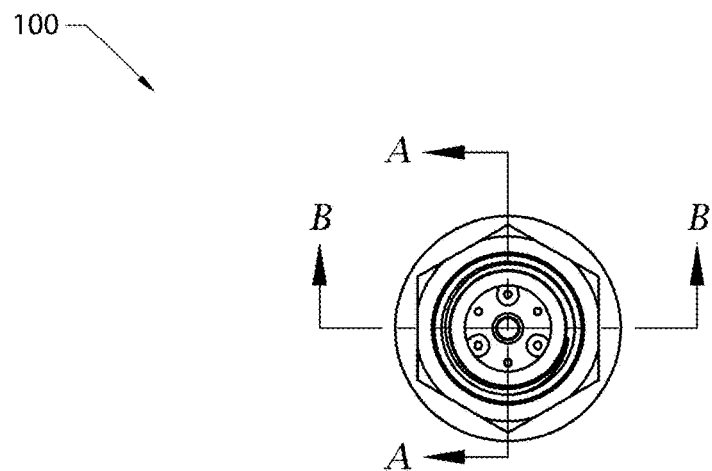
FIG. 6a shows a sensing end of an exemplary embodiment of a fluid property sensor.
Figure 6B:
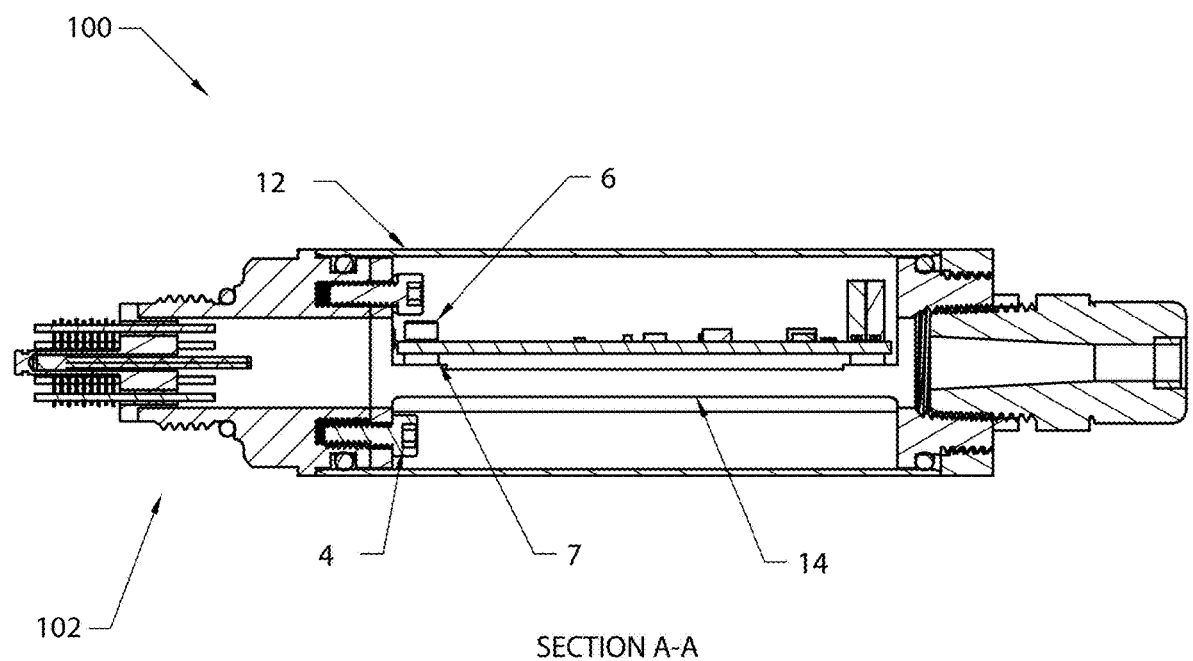

The auto-balancing bridge measurement technique uses an inverting op-amp to cancel the current flowing through the test impedance by establishing a virtual ground point in the circuit as shown in FIG. 5b. Given the voltages $V_1$ and $V_2$ (which are measured by an ADC), and the value of the reference resistor $R_{ref}$, the current through both the test impedance and the reference resistor may be calculated:

$$\frac{V_1}{X} = I = \frac{-V_2}{R_{ref}} \quad (3)$$

Allowing for the unknown impedance to be determined:

$$Z = \frac{-V_1}{V_2} R_{ref} \quad (4)$$

Both the I-V and auto-balancing-bridge techniques are able to calculate the unknown impedance value. However, the I-V technique may susceptible to larger errors when the unknown impedance value Z is very large compared to the $R_{ref}$ reference resistor value. The I-V calculation requires computing the difference of the $V_1$ and $V_2$ voltages. When Z is very large compared to $R_{ref}$, the two voltages can be very similar and even tiny measurement errors may have a significant effect when the difference of the two voltages appears in the denominator of the impedance calculation. As the frequency increases, the phase measurement may tend to lose some precision leading to errors in the impedance calculation when using the I-V method.

To quantify the error, calculations were made using both measurement techniques to simulate what would happen if a 2V AC reference signal and a 1K reference resistor were used to measure various test resistances under the condition that the measured values were perturbed to incur a voltage error of 1 mV and a phase error of 1°. In Table 1 and Table 2, the measurement technique is considered stable if the perturbed measurement, Z, is near the actual impedance, Z, and does not exhibit a large imaginary component:

TABLE 1

| I-V Error Simulation. | | | |
|---|---|---|---|
| Z(Ω) | $|V_\#|$ | Z˜ (R + Xi) | 5Z5 |
| 1000 | 4.000 | 999.9 − 34.88i | 1000.05 |
| 10000 | 2.200 | 9659.6 − 1857.5i | 10005.00 |

TABLE 1-continued

I-V Error Simulation.

| Z(Ω) | |V#| | Z⁻ (R + Xi) | 5Z5 |
|---|---|---|---|
| 100000 | 2.020 | 24153.2 − 43239.74i | 100502.00 |
| 1000000 | 2.002 | 2770.52 − 57107.04i | 1052631.58 |

Table 1 shows that, using the I-V technique, as the test impedance increases the real and imaginary parts of the "measured" impedance quickly diverge from their actual values. While the magnitudes of the measured impedances are nearly correct, the distribution of that impedance between resistance (R) and reactance (X) is incorrect.

The same simulation was performed using the auto-balancing bridge technique:

TABLE 2

Auto-Balancing Bridge Error Simulation.

| Z(Ω) | |V#| | Z⁻ (R + Xi) | 5Z5 |
|---|---|---|---|
| 1000 | 2.000 | 999.85 − 17.452i | 1000.05 |
| 10000 | 0.200 | 9998.48 − 174.52i | 10005.00 |
| 100000 | 0.020 | 99984.77 − 1745.24i | 100502.00 |
| 1000000 | 0.002 | 999847.70 − 17452.40i | 1052631.58 |

Table 2 shows that, using the auto-balancing bridge technique, as the test impedance increases the relative error in the real and imaginary parts of the "measured" impedance was extremely stable and near the expected value. An interesting observation is that the magnitude of the measured impedance was the same for both measurement techniques and it was simply the distribution between R and X that changed. Given this comparison, the auto-balancing bridge technique may be superior when faced with the possibility of measurement error.

Sine Fitting

Having selected an appropriate measurement technique, measurement of the frequency response of the fluid is then performed, by exciting the fluid with a sequence of sine waves.

The sine waves may be generated by a sinewave generator, which is clocked by a microcontroller. An exemplary generator may be an AD9833 generator, and an exemplary microcontroller may be a MSP432P401R microcontroller. The microcontroller can include or be communicatively coupled to an ADC which may share a common clock with the generator, thereby preventing frequency drift between the ADC and the excitation signal. Given a precisely known frequency it is possible to extract the contribution of that frequency from a set of time-domain samples; the frequency of the sampled signal may only be known precisely if the ADC is phase-locked to the excitation signal. Generally, the ADC clock speed, $f_{ADC}$, may not be equal to the generator clock speed, $f_{GEN}$, but their ratio can be constant.

For each excitation frequency, f, the sampling procedure periodically measures the $V_2$ voltage, collecting a set of sample tuples $(t_k, v_k)$. Since the ADC sampling trigger is periodic, without loss of generality the sampling times can be redefined as integral values and transform on the signal frequency can be applied to the new time units:

$$t_k = 1, 2, 3, \ldots, N = k \tag{5}$$

$$\omega = 2\pi f \frac{f_{GEN}}{f_{ADC}} \tag{6}$$

We must then find the best-fitting sine wave for the sample set. Since the frequency is precisely known, we can perform a least-squares derivation of the best fit using a closed-form solution, utilizing the following equation for a sine wave written as a sum of sine and cosine waves with zero phase shift:

$$y = V + a\sin(\omega t) + b\cos\omega t \tag{7}$$

We also find that equation (7) is equivalent to the following equation for a sine wave written as a single sine wave with non-zero phase shift:

$$y = V + A\sin(\omega t + \varphi), \tag{8}$$

$$A = \sqrt{a^2 + b^2}, \varphi = \tan^{-1}\frac{b}{a}$$

Using the form in equation (7) instead of the standard form from equation (8), the least-squares fitting problem reduces from a non-linear to a linear one (since ω is known). The procedure is described in Jacquelin, Jean, (2014), *Regression Sinusoidale: Regressions et equations integrals*, 21-36, and is incorporated herein in its entirety. Following the procedure, we arrive at the following:

$$\begin{bmatrix} V \\ a \\ b \end{bmatrix} = \begin{bmatrix} N & \sum \sin\omega t_k & \sum \cos\omega t_k \\ \sum \sin\omega t_k & \sum \sin^2\omega t_k & \sum \sin\omega t_k \cos\omega t_k \\ \sum \cos\omega t_k & \sum \sin\omega t_k \cos\omega t_k & \sum \cos^2\omega t_k \end{bmatrix}^{-1} \begin{bmatrix} \sum v_k \\ \sum v_k \sin\omega t_k \\ \sum v_k \cos\omega t_k \end{bmatrix} \tag{9}$$

Given the choice in equation (5), the values for $t_k$ are simply the integral values from 1 to N where N is the number of samples taken. The elements of the 3×3 matrix in equation (9) are written in terms of ω and $t_k$, which are known in advance for a given N. In fact, there are closed-form solutions for each of these summations that can be computed in O(1) time rather than the naïve O(N) algorithm. Unfortunately, the same cannot be said for the 3×1 matrix on the right-hand side of equation (9); here we also have $v_k$ terms which are clearly not known in advance.

The algorithm that is run on the microcontroller may be as follows. In a first step, at the start of a frequency, compute the 3×3 matrix inverse using the closed forms. In a second step, compute the $\Sigma v_k$, $\Sigma v_k \sin \omega t_k$, and $\Sigma v_k \cos \omega t_k$ sums in real-time as the ADC is sampled, wherein no RAM storage may be required. In a third step, at the end of the sampling period, compute the matrix product in equation (9) to derive V, a and b. In a fourth step, using equation (8), compute A and φ. In a fifth step, return V, A and φ to the client code for transmission to a data hub. Finally, in a sixth step, the process may be repeated from the first step, for the next frequency.

As part of the sine-fitting algorithm, an $R^2$ goodness-of-fit estimation may also be computed. The $R^2$ value may be helpful as it may provide an indication of whether or not the signal that is being measured actually appears to be a sine wave.

Computation of $\sin \omega t_k$ and $\cos \omega t_k$

As part of the sine-fitting algorithm, it is necessary to compute a different sine and cosine value for each sample point. Sine and cosine of arbitrary angles are notoriously expensive to compute and the range-reduction operation for large angles is very time- and space-consuming. In equation (5) the sample times $t_k$ were transformed to be integers in the range 1 . . . N so that all of the necessary values may be computed, even for large angles.

There are a number of recurrence relations that allow for computing $\sin \omega k$ given the sine of smaller multiples of $\omega$. One such method is the well-known Chebyshev relation:

$$P = 2\cos\omega \tag{10}$$

$$T_1 = \sin 1\omega \tag{11}$$

$$T_2 = \sin 2\omega \tag{12}$$

$$T_k = P \cdot T_{k-1} - T_{k-2} = \sin k\omega \tag{13}$$

Given the initial values computed in equations (10), (11) and (12), the sine values of larger multiples can be computed using a single multiply-subtract FPU instruction (13). The same recurrence can be used to compute cosine values by substituting the cosine function in place of the sine function in equations (11), (12) and (13). However, with single-precision FPU arithmetic this recurrence may not stable for large k. A lesser-known but more-stable recurrence relation is as follows:

$$P = 2\sin^2\frac{\omega}{2}, Q = \sin\omega \tag{14}$$

$$S_1 = \sin 1\omega, C_1 = \cos 1\omega \tag{15}$$

$$S_k = \sin k\omega = S_{k-1} - (PS_{k-1} - QC_{k-1}) \tag{16}$$

$$C_k = \cos k\omega = C_{k-1} - (PC_{k-1} - QS_{k-1}) \tag{17}$$

This recurrence requires that the sine and cosine values be maintained simultaneously, which is feasible given the sums required in equation (9). This recurrence may be numerically stable for k in the hundreds of thousands using single-precision math and may further be for much larger k when using double-precision math.

Sensor Structure

Figure 7:
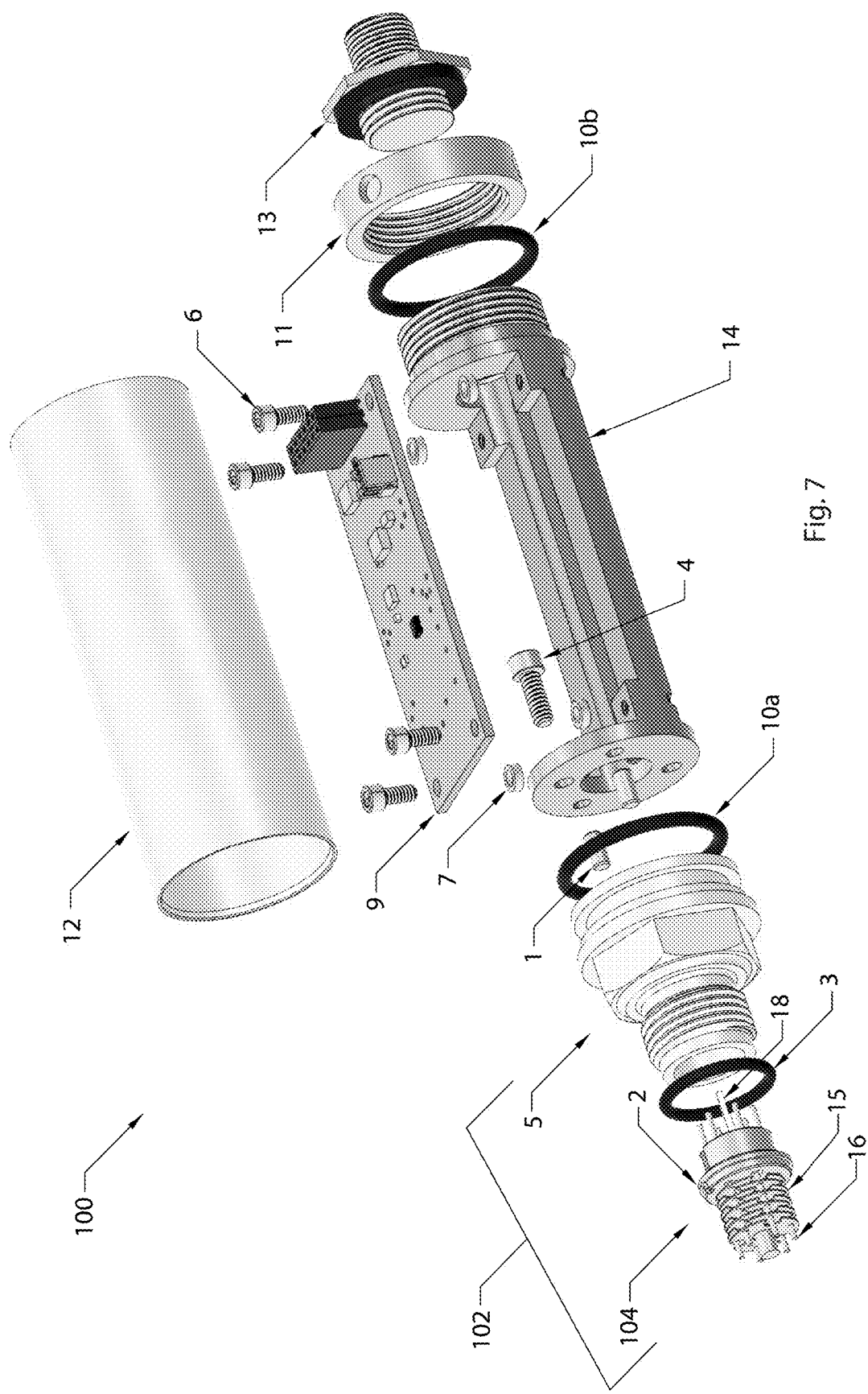
FIG. 7 is an exploded view of the exemplary embodiment of a fluid property sensor.

According to at least one exemplary embodiment, and as shown in in FIGS. 6-14, a fluid property sensor 100 is provided. FIG. 6a shows a view of the sensing end of sensor 100. FIG. 6b shows a cross-sectional view of sensor 100 along line A-A of FIG. 6a, while FIG. 6c shows a cross-sectional view of sensor 100 along line B-B of FIG. 6a, and FIG. 6d shows certain internal components of sensor 100. The sensor includes a central chassis 14, a sensor head 102 coupled to the chassis and disposed at a sensing end of the sensor, and a cord grip 13 coupled to the chassis and disposed at a connecting end of the sensor, which may be opposite the sensing end. FIG. 7 is an exploded perspective view of sensor 100.

As shown in FIG. 6-7, the central chassis 14 has a proximal end to which the cord grip 13 is coupled and a distal end to which the sensor mounting head 5 is coupled. The central portion of the chassis may be provided with at least one slit defined therethrough for the purposes of weight reduction. A plurality of apertures receive fasteners 4, for example hex screws, for mounting a printed circuit board 9 onto chassis 4.

The proximal end of chassis 4 includes an outer thread as well as a bore with an inner thread defined in the sidewall thereof. The inner thread of the chassis engages an outer thread of a distal end of cord grip 13. A collar 11 having a bore with an inner thread defined in the sidewall thereof engages the outer thread of the proximal end of the chassis 4. The collar 11 provides compressive force so as to create a waterproof seal between the chassis 4 and the cord grip 13. Cord grip 13 can also include a central bore which is in communication with the bore of chassis 4, and through which cables for various connections (not shown), such as electrical and communications connections, may be provided to PCB 9.

A central bore is provided through the sensing-end-proximal end of chassis 4, as well as a plurality of peripheral bores. The peripheral bores receive fasteners therethrough, for example screws, which engage threaded bores of sensor mounting head 5. Tightening the fasteners causes the proximal end of sensor mounting head 5 to tightly abut the distal end of chassis 4. Sensor mounting head 5 can also include a central bore which is in communication with the central bore of chassis 4, and through which cables for various connections (not shown), such as electrical and communications connections, may be provided between the sensing components of the sensor head and PCB 9.

Figure 8A:
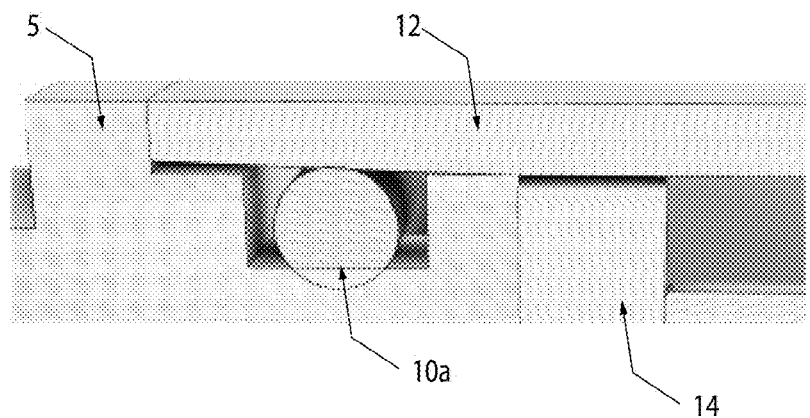
FIGS. 8a-8b are detailed cross-sectional views of the exemplary embodiment of a fluid property sensor.
Figure 8B:
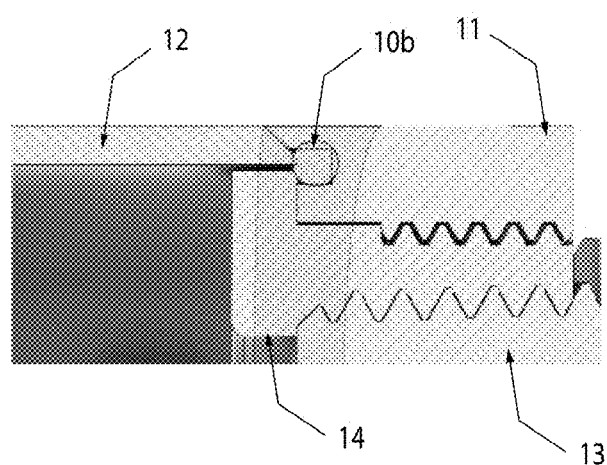
Figure 9A:
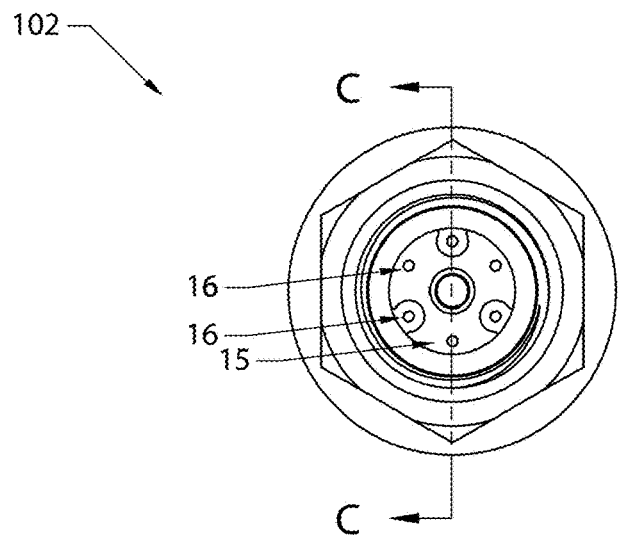
FIG. 9a is a front view of an exemplary embodiment of a sensor head of a fluid property sensor.
Figure 9B:
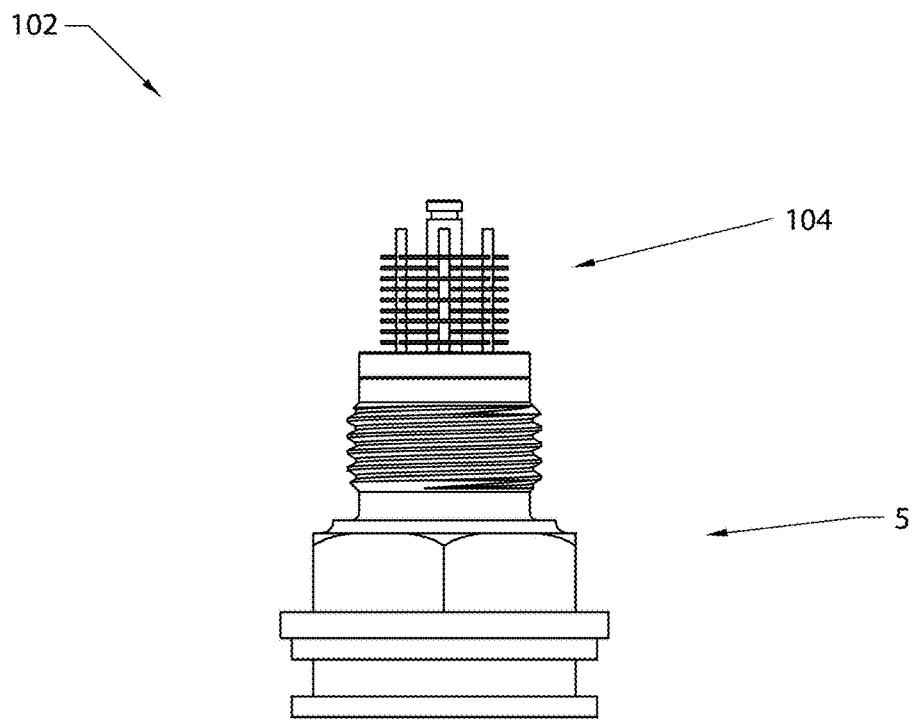
FIG. 9b is a side view of the exemplary embodiment of a sensor head of a fluid property sensor.
Figure 9C:
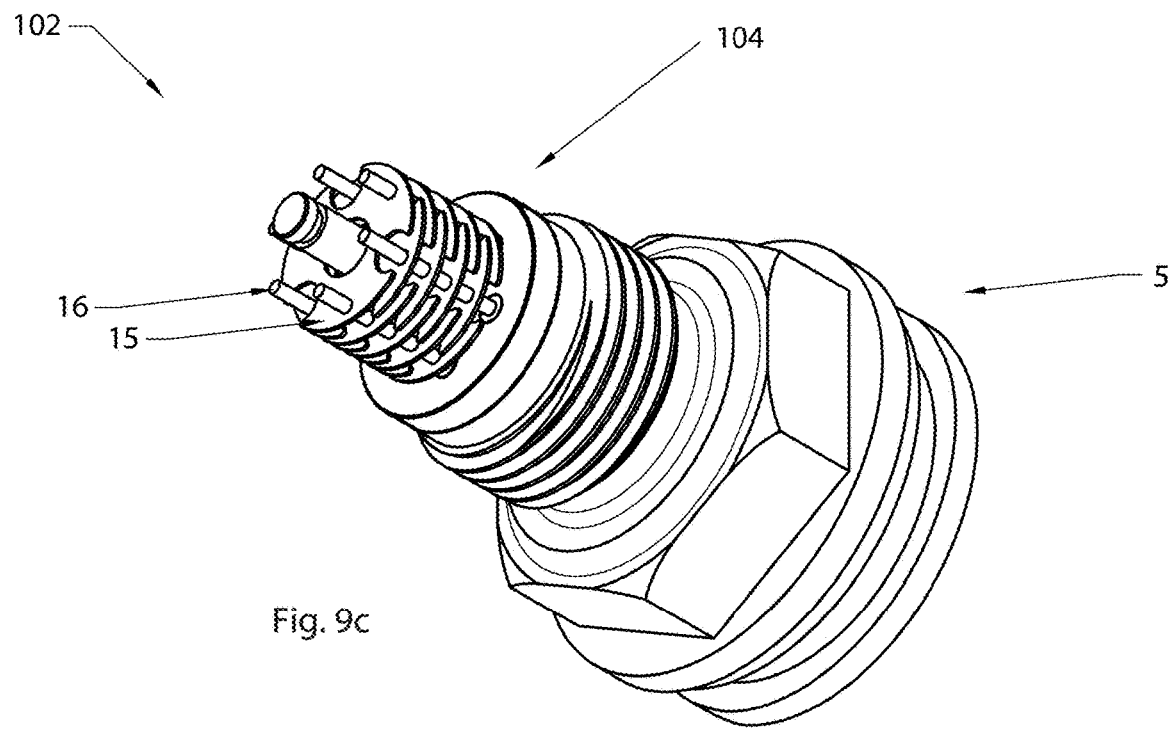
FIG. 9c is an isometric view of the exemplary embodiment of a sensor head of a fluid property sensor.
Figure 9D:
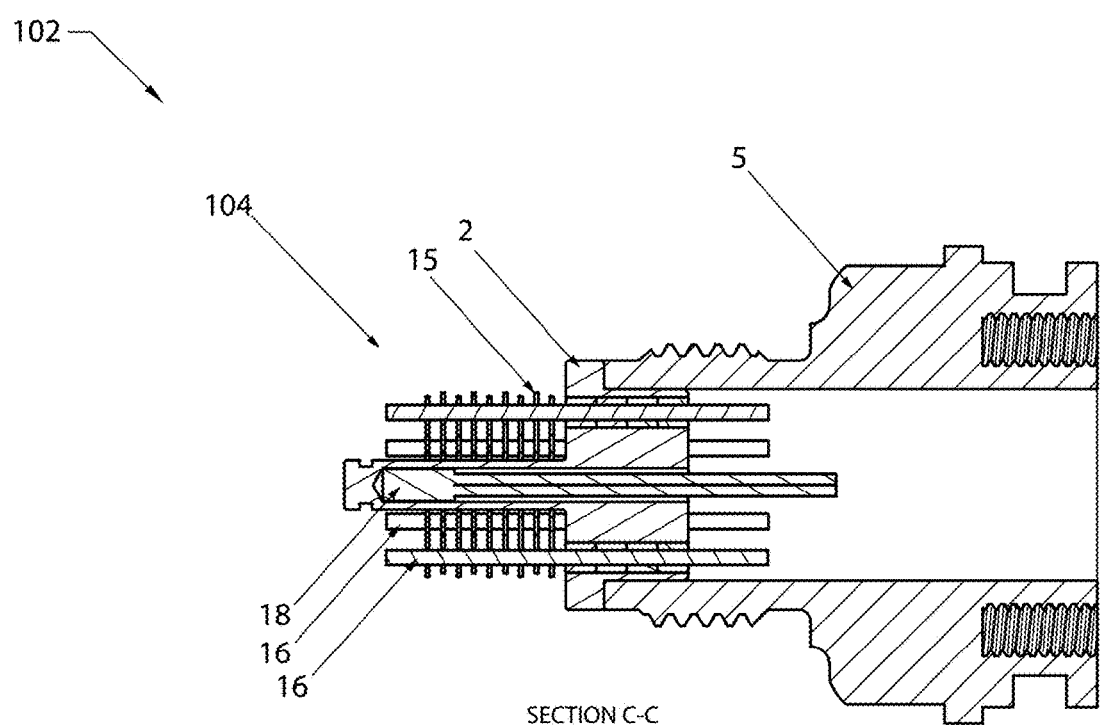
Figure 10D:
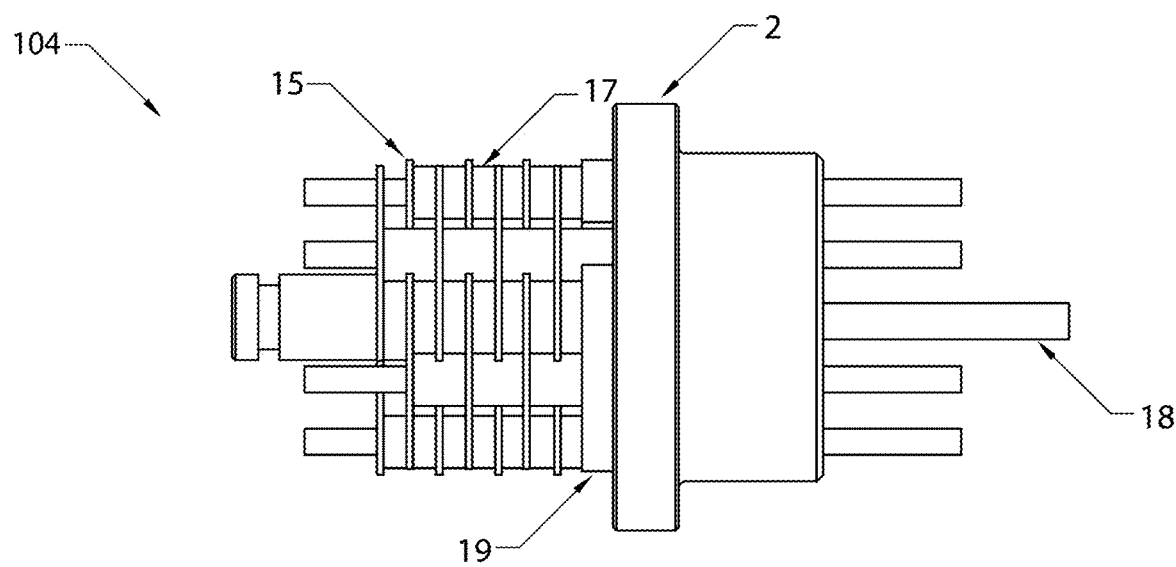
FIG. 10d is a side view of the exemplary embodiment of a sensing unit of a fluid property sensor.
Figure 10E:
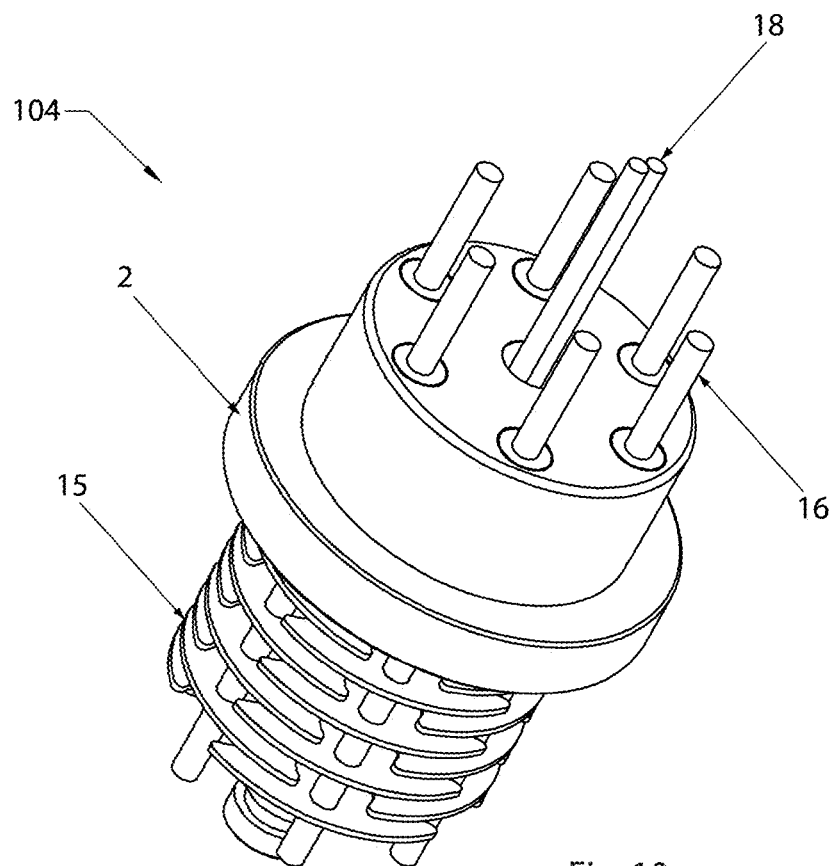
FIG. 10e is an isometric view of the exemplary embodiment of a sensing unit of a fluid property sensor.

A tubular outer housing 12 encloses chassis 4 and the central cavity of sensor 100. The outer housing 12 is provided around the perimeter of sensor 100 and proximate chassis 4. Outer housing 12 is further disposed between collar 11 and a circumferential rib extending outward from sensor mounting head 5. As shown in FIG. 8a, a first O-ring 10a is provided within a circumferential groove that is disposed proximate the circumferential rib. A waterproof seal is thus created between the outer housing 12 and sensor head 102. Similarly, as shown in FIG. 8b, a groove is provided in the inward-oriented face of collar 11, and a second O-ring 10b is received therein. Furthermore, the proximal edge of outer housing 12 is chamfered, and a portion of the inward-oriented face of collar 11 is chamfered at a similar, but slightly different angle, thereby creating an additional metal-metal seal. A vertex of the proximal edge of outer housing 12 also impinges on O-ring 10b, further enhancing the waterproof seal between outer housing 12, collar 11, and cord grip 13.

FIGS. 9a-9d show an exemplary embodiment of a sensor head 102 with a first exemplary embodiment of a sensing unit 104. As shown in the cross-sectional view of FIG. 7d, sensor head 102 includes a sensor mounting head 5 and a sensing unit 104 abutting the distal end of the sensor mounting head 5 and partially received within the bore of sensor mounting head 5. An orbital weld on the exterior surface couples sensing unit 104 to sensor mounting head 5.

The first exemplary embodiment of sensing unit 104 is shown in further detail in FIGS. 10a-10e. Sensing unit 104 includes a housing 2 having a base and a hollow tip. A resistance temperature detector (RTD) probe 18 is received within the central bore of the hollow tip. Base also includes a plurality of peripheral bores, for example six bores, defined therethrough for receiving a corresponding plurality of pins 16. In some exemplary embodiments, pins 16 may be formed from a nickel-cobalt ferrous alloy such as Kovar 52, and may further be electroplated with a nickel coating, followed by a gold coating. In some exemplary embodiments, pins 16 may be formed from a nickel-chromium based alloy such as Inconel. Pins 16 extend from beyond the inner end of the base, through the peripheral bores, and until approximately a similar longitudinal position as the tip of RTD probe 18. Pins 16 may have a spacing of approximately 60° with respect to each other. RTD probe 18 and pins 16 may be electrically coupled to the PCB 9.

A plurality of plates 15, for example 6-8 plates, are mounted on pins 16, and spaced apart by spacers 17, which may be formed from alumina, and disposed on the pins between each pair of plates. As shown in FIG. 8c, an exemplary plate 15 can include a central aperture 15a through which the hollow tip is received, a plurality of peripheral apertures 15b, for example three apertures, for receiving a corresponding first plurality of pins 16 therethrough, and plurality of cutouts 15c for receiving a corresponding second plurality of pins 16 therethrough such that the second plurality of pins does not contact plate 15. Each plate may be coupled to the pins that are received through the peripheral apertures 15b of that plate. Plates 15 may be mounted on pins 16 in an alternating manner, wherein a first plate is attached to a first set of pins, and the immediate adjacent plate is attached to the set of pins that do not contact the first plate, as seen in FIG. 7c. Plates 15 may be formed from thin sheets of Nickel and Kovar, and manufactured by photo etching so as to achieve desired dimensions. Coupling between plates 15 and pins 16 may be facilitated, for example, by soldering washers, which may be made from a gold-tin alloy such as Au80Sn20. The first set of pins, and the plates coupled thereto, may function as the driving electrode(s) of the sensing unit. The second set of pins, and the plates coupled thereto, may function as the sensing electrode(s) of the sensing unit.

The spacing and shape of the plates may be advantageous to provide an improved measurement signal. An exemplary such spacing may be approximately 1.02 mm to 0.76 mm, for example 0.89-0.90 mm between the two adjacent plates. Other spacings and shapes for the plates that enable the sensor to function herein may be contemplated and provided as desired. The desired spacing may be provided by beads 17. In some exemplary embodiments, beads 17 may further support pins 15 within bores defined thru the housing 2 of sensing unit 104. In some exemplary embodiments, and a glass to metal seal 17a may be formed between the supporting beads and housing 2 so as to isolate the pins from the housing. Furthermore, a spacer 19, which may be made of a ceramic material, for example Macor, may be provided abutting housing 2.

Figure 11A:
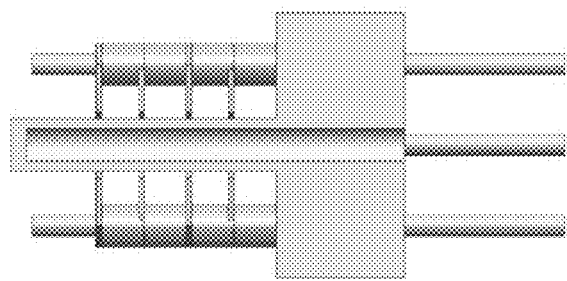
FIG. 11a is a cross-sectional view of another exemplary embodiment of a sensing unit of a fluid property sensor.
Figure 11B:
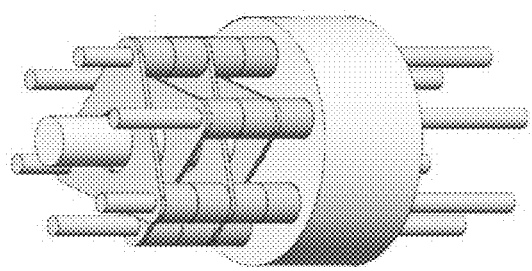

FIGS. 11a-11b show a second exemplary embodiment of a sensing unit. The second embodiment of the sensing unit may be similar to the first embodiment of sensing unit 104 but may use differently shaped plates. The plates of the second embodiment of the sensing unit may have a substantially triangular configuration.

Figure 12A:
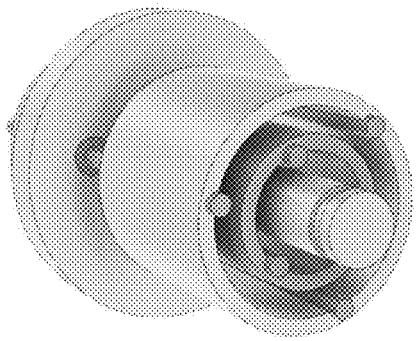
FIG. 12a shows another exemplary embodiment of a sensing unit of a fluid property sensor.
Figure 12B:
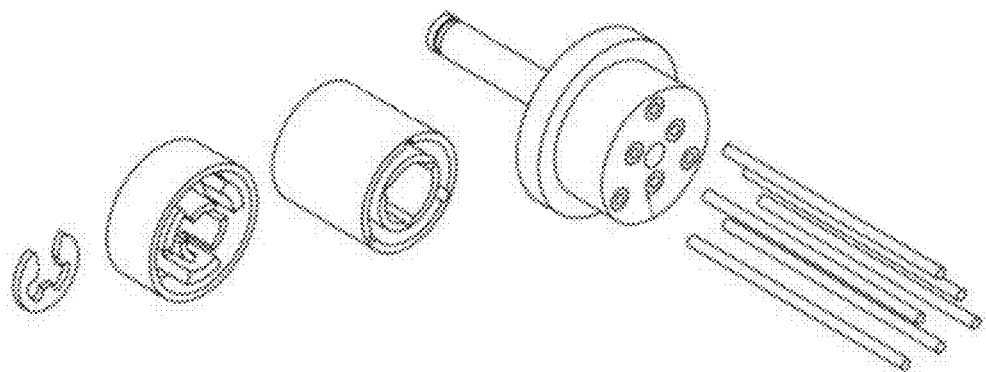

FIGS. 12a-12b show a third exemplary embodiment of a sensing unit. The third embodiment of the sensing unit may utilize a set of concentric rings in lieu of plates. An outer ring may be coupled to a first set of pins, while an inner ring may be coupled to a second set of pins. The rings may be formed from stainless steel and may be received within bores of base. The bores may be provided with glass-to-metal seals, within which the pins are received. The first set of pins may be disposed at a first radius, and may be offset from each other by 60°. The first set of pins may be received within grooves defined in the inner surface of outer ring, and then welded thereto. The second set of pins may be disposed at a second radius, and may be offset from each other by 60°. The second set of pins may be received within grooves defined in the inner surface of inner ring, and then welded thereto.

A groove disposed at a distal end of hollow tip may receive a spacer adapted to maintain the rings spaced apart from each other and in a concentric relationship. An end cap, formed from polyester ether ketone (PEEK), may be disposed at the distal end of the third embodiment of the sensing unit and may be maintained in position by a retaining clip.

Figure 13:
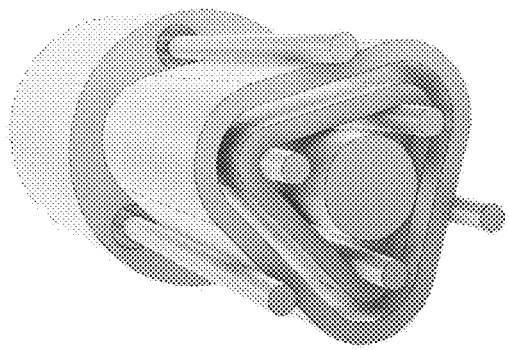
FIG. 13 shows another exemplary embodiment of a sensing unit of a fluid property sensor.

FIG. 13 shows a fourth exemplary embodiment of a sensing unit. The fourth exemplary embodiment of the sensing unit may be similar to the third embodiment of the sensing unit but may use differently shaped concentric rings. The concentric rings of the fourth embodiment of the sensing unit may have a substantially triangular configuration. The pins may be coupled directly to the surfaces of the concentric rings, and thus the concentric rings may not include grooves in the surfaces thereof.

In some exemplary embodiments, a 4-probe measurement may be used for a water fluid property sensor, and a 2-probe measurement may be used for an oil fluid property sensor. In some exemplary embodiments, high pressure feed throughs for the electrical contacts at the front of the sensor head may be provided. In some exemplary embodiments, the cord grip may be provided as a male pin header adapter so as to allow the fluid property sensor to not be constantly connected to a cable. In some exemplary embodiments, a double O-ring system may be used to seal the PCB. Furthermore, the PCB chassis may be anodized as both the cord grip and the back collar thread onto the chassis. Anodizing the chassis can reduce the likelihood of galling, which may be an issue with stainless steel and aluminium threads. In some exemplary embodiments, the sensor head may be provided with a manifold type design so as to protect the sensor head elements. The manifold may be provided separately from the fluid property sensor and may be designed specifically for installation to a wide variety of deployment situations. The manifold can both protect the sensor, and prevent any sensor head plates that may dislodge from traveling into the surrounding environment. The manifold may also reduce the effect of electromagnetic interference and may reduce noise.

Turning to FIG. 14, and according to another exemplary embodiment, a fluid particle sensor 500 is disclosed. The fluid particle sensor may be configured to use electromagnetic induction to detect and analyze microscopic metallic particles within a fluid such as a lubricant.

In some exemplary embodiments, a fluid particle sensor 500 may have a nested coil design with two drive coils and single sense coil, while in other exemplary embodiments, a single drive coil and a single sense coil may be provided. A signal may be taken from the sense coil and amplified. A signal may also be taken from the drive coil. Both the amplified sense coil signal and the driver signal may be presented as inputs to an analogue multiplier or mixer which results in an output signal. This can further be amplified, and the carrier frequency may be removed, thereby passing just the signature caused by the particle. The signature may be different depending if a ferrous or non-ferrous particle is detected.

In other exemplary embodiments, as metallic particles flow through a sensor, the fluid particle sensor 500 can interpret the electromagnetic induction field to determine the type of metallic particle (i.e., ferrous or non-ferrous), the size of the particle, and the exact time that the particle travels through the electromagnetic induction field.

Figure 14A:
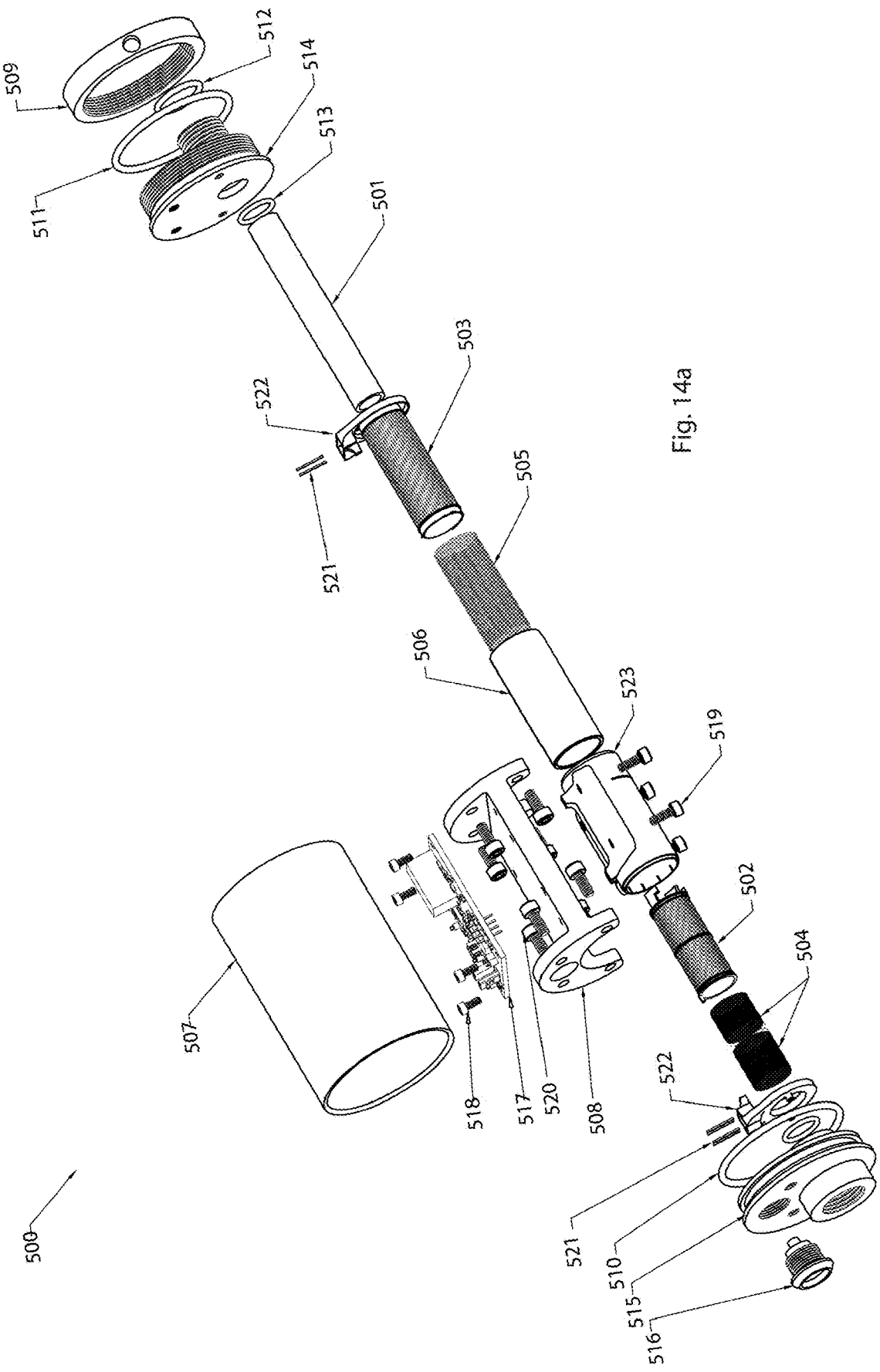
FIG. 14a is an exploded view of an exemplary embodiment of a fluid particle sensor.
Figure 14B:
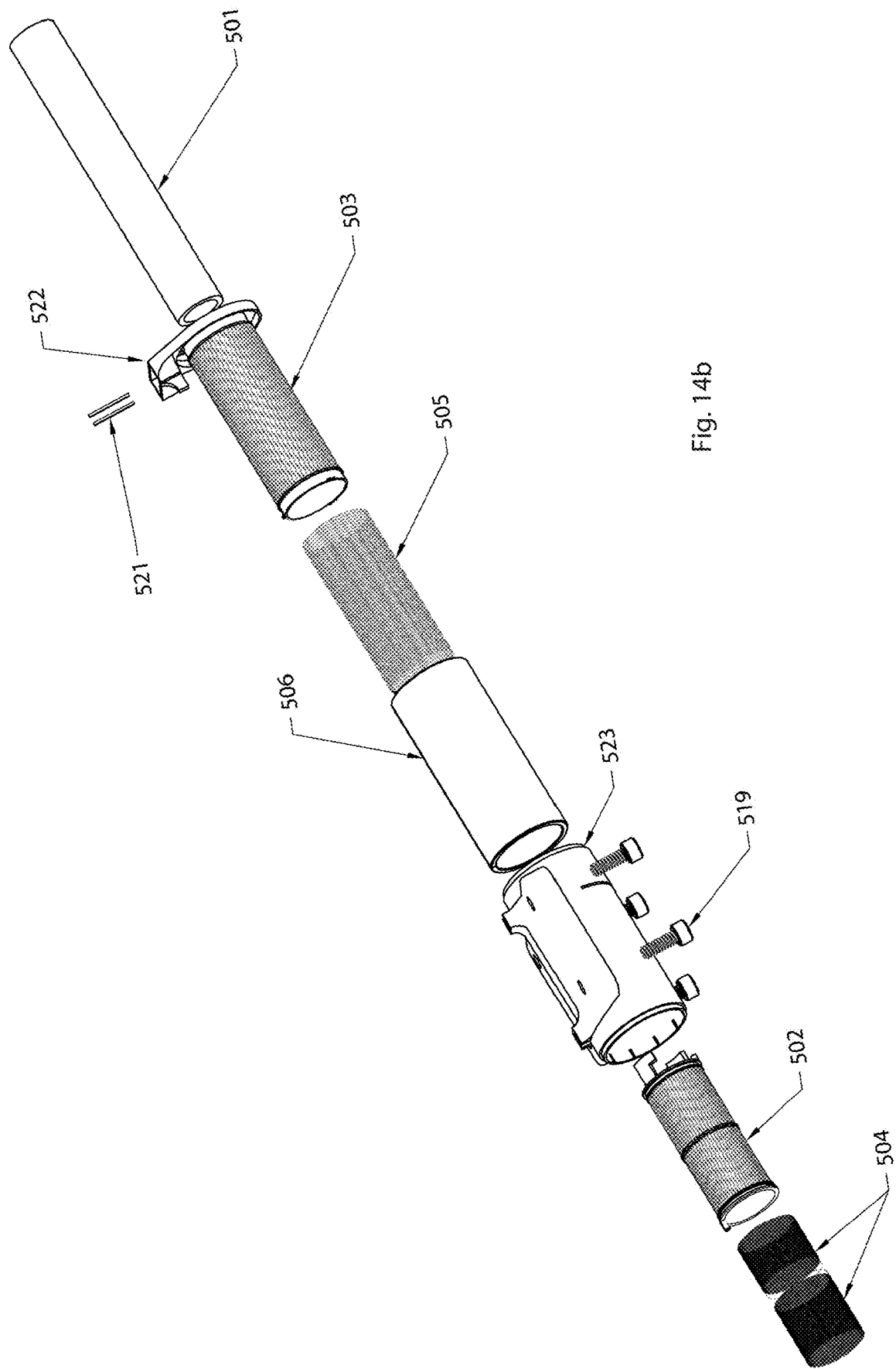
FIG. 14b is an enlarged exploded view of the coil arrangement of the exemplary embodiment of a fluid particle sensor.
Figure 15A:
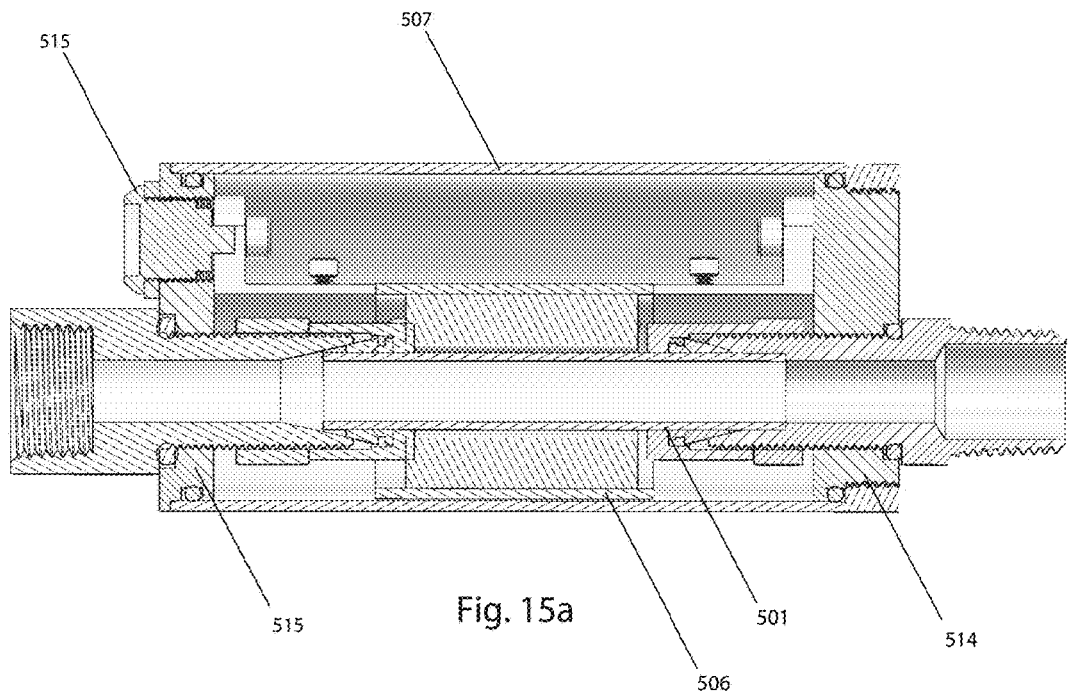
FIG. 15a is a cross-sectional view of another exemplary embodiment of a fluid particle sensor.
Figure 15B:
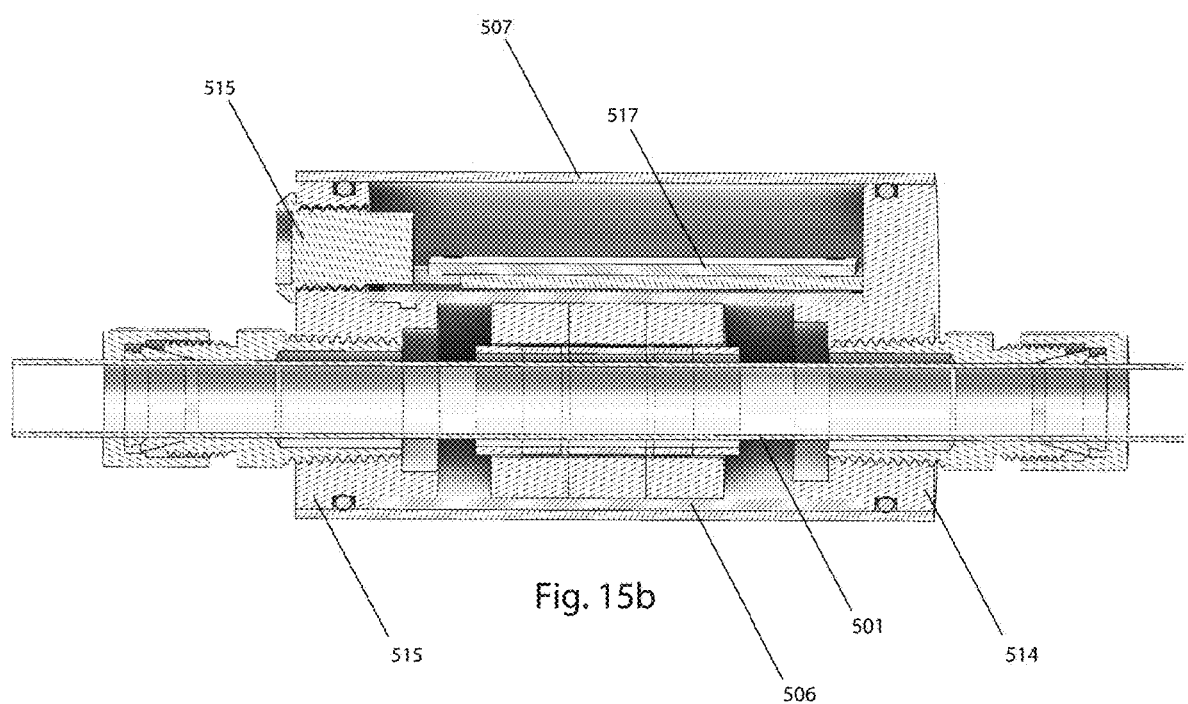
FIG. 15b is a cross-sectional view of another exemplary embodiment of a fluid particle sensor.

FIG. 14a shows an exploded view of an exemplary embodiment of fluid particle sensor 500. FIG. 14b shows an enlarged exploded view of the coil arrangement of the exemplary embodiment of fluid particle sensor 500. FIGS. 15a-15b show cross-sectional views of other exemplary embodiments of fluid particle sensors. Particle sensor 500 may include a fluid tube 501, which may be formed from PEEK, through which the fluid to be analyzed can pass. A sensing bobbin 502 that has a sensing electrical wire 504 forming two sense coils and wrapped around the outer surface of the sensing bobbin may enclose fluid tube 501. A driving bobbin 503 that has a driving electrical wire 505 forming a drive coil and wrapped around the outer surface of the driving bobbin may enclose sensing bobbin 502. A magnetic shield 506 formed from a nickel-iron alloy may enclose driving bobbin 503.

Fluid tube 501, sensing bobbin 502, driving bobbin 503, and magnetic shield 506 may be disposed within a bobbin assembly sleeve 523. End caps 522 may be disposed on both ends of sleeve 523, enclosing bobbins 502, 503 and shield 506 within the interior of sleeve 523. Fluid tube 501 may extend through apertures in the end caps 522 so as to be in fluid communication with a fluid ingress conduit and a fluid egress conduit. An O-ring 513 may be provided on each end of fluid tube 501.

The bobbin assembly sleeve 523 and aforementioned components may be coupled to a first surface of chassis 508 by fasteners 519. A PCB 517 may be coupled to an opposing surface of chassis 508 by fasteners 518. Terminal pins 521, disposed within cavities defined in end caps 522 may provide electrical communication between sensing wire 504 and PCB 517, and between driving wire 505 and PCB 517.

Chassis 508 and the components mounted thereon may be enclosed by a cylindrical housing 507 and a pair of port walls. A male port wall 514 may be coupled to a first end of chassis 508 by fasteners 520. A collar 509 may engage a threaded circumference of male port wall 514, with an O-ring 511 disposed therebetween. The collar can provide compressive force on wall 514 and O-ring 511 so as to provide a waterproof seal between male port wall 514, housing 507, O-ring 511, and collar 509. Male port wall 514 may further be provided with a male threaded compression fitting, for example a male Swagelok fitting, and a face seal O-ring 512 between the male threaded fitting and the male port wall 514.

A female port wall 515 may be coupled to a second end of chassis 508 by fasteners 520. A circumferential rib of female port wall 515 may abut an edge of housing 507, and an O-ring 510 may be provided in a circumferential groove adjacent the circumferential rib. O-ring 510 may be impinged by housing 507 so as to create a waterproof seal between female port wall 515, O-ring 510, and housing 507. An electrical connector 516, for example a 6-pin receptacle, may be provided with an outer thread that engages a threaded bore that is provided through female port wall 515, allowing electrical and communicative coupling with PCB 517. Male port wall 514 may be further provided with a female threaded compression fitting, for example a female Swagelok fitting, and a face seal O-ring between the male threaded fitting and the female port wall 515.

Fluid tube 501 may be disposed between the inner surfaces of port walls 514, 515, with an O-ring 513 provided between an end of fluid tube 501 and the corresponding inner surface of port walls 514, 515. A gap is may be at each end of tube 501 so as to provide tolerance for linear expansion of tube 501 due to mechanical creep caused by thermal cycling.

In some exemplary embodiments, a hose passing through the sensor may be used in lieu of fluid tube 501. In some exemplary embodiments, a hose or a tube may be held in place by compression fittings.

According to some exemplary embodiments, a fluid particle sensor may have a nested coil design with one drive coil and two sense coils, taking the signals from the coils and using instrumentation amplifiers to convert the signal, subtracting the signals from each other, and then gaining the signals. In some exemplary embodiments, a sinusoidal voltage at a known frequency may be applied across the drive coil. In some exemplary embodiments, analog subtraction of sense coil signals may be performed, then gain may be maximized, and the raw output may be then heavily filtered to optimize the desired frequency. In some exemplary embodiments, the sense coils may be connected in series with opposite polarity and the top voltage may be observed (with the bottom being connected to ground). In some exemplary embodiments, the sense coils may be connected in parallel with opposite polarity and the top voltage along the resistor may be observed (with the bottom being connected to ground). In some exemplary embodiments, the drive coils may be driven with an AC coupled signal on a bipolar circuit board.

In some exemplary embodiments, the particle sensor may include a sine wave generator that is clocked at a known frequency and that generates the drive signal. The signal can go through an impedance and return where it can be measured with an analog to digital converter, which may be built into a microcontroller. The measured points may then have a sine wave fitting algorithm applied to them so as to extract the amplitude and phase. Instead of a Fourier transform being performed, a least-squares-sine fit may be performed. This allows an advantageous use of data from partial sine waves; an integer number of periods is not necessary; the algorithm is therefore frequency-independent.

In some exemplary embodiments, a microcontroller may perform single precision floating point math or double precision math. So as to compute tens of hundreds of thousands of values for the sine and cosine functions a recursive relation may be used. Furthermore, in some exemplary embodiments, Kahan summation may be used to provide desired accuracy for up to tens of thousands of sine values. In some exemplary embodiments, the Kahan summation and the recursive sine and cosine relation may be provided and optimized so that these functions can run in less than 48 cycles per sample. In some exemplary embodiments, Kahan summation and recursive relation may be combined to enable the sensor to function as described herein.

In some exemplary embodiments, the bobbins may be provided with lateral grooves and internal tubes under the coils. This can allow for "sewing" the wire out of the assembly while keeping tension to hold the wires in place. Furthermore, alcohol-bondable wires may be provided to maintain the wires in place once wound. Potting of the coil and bobbin assemblies may be done utilizing clear resin or a UV-curable epoxy having a quick setting time and low viscosity so as to effectively fill all gaps. The sensing coil bobbin may be provided with a plunger seal on both ends and with epoxy injection ports for filling the encapsulant. The bobbin can be moved with an alignment key that can move the bobbin linearly and rotationally inside the assembly. A fluorescent light bulb can fit within the inner bobbin and, after the mechanical balancing has been achieved, the light can be turned on to set the epoxy and cure the assembly in its balanced state.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A fluid sensor, comprising:
   a microcontroller;
   a sensing unit communicatively coupled to the microcontroller, the sensing unit including a driving element and a sensing element, the sensing unit further comprising:
      a housing;
      an elongated resistance temperature detector having a longitudinal axis and extending within a central bore of the housing;
      a plurality of elongated electrode pins arranged axially parallel to and radially surrounding the resistance temperature detector, each electrode pin having a longitudinal axis and extending within a corresponding peripheral bore of the housing; and
      a plurality of electrode plates mounted on the electrode pins and oriented orthogonally thereto, the plates being spaced apart at regular intervals in a direction of the longitudinal axis of the resistance temperature detector;
   wherein the microcontroller generates a signal to excite the driving element of the sensing unit and receives a signal from the sensing element of the sensor so as to perform a measurement of a complex impedance of a fluid;
   wherein the sensing unit is adapted to perform the measurement, the measurement being an electrochemical impedance spectroscopy (EIS) sweep of the fluid; and
   wherein a property of the fluid is determined based on the measurement, the property being an electrochemical fingerprint of the fluid, based on impedance exhibited due to a capacitance of the fluid, collected over the EIS sweep.

2. The sensor of claim 1, wherein:
   the plurality of electrode pins comprises a first set of pins and a second set of pins;
   the plurality of electrode plates comprises a first set of plates and a second set of plates;
   the first set of pins is coupled to the first set of plates;
   the second set of pins is coupled to the second set of plates; and
   the first set of plates and the second set of plates are disposed in an alternating arrangement in the direction of the longitudinal axis of the resistance temperature detector, such that any two immediately adjacent plates belong to different sets of plates.

3. The sensor of claim 1, wherein the first set of pins and the first set of plates are the sensing element and the second set of pins and the second set of plates are the driving element.

4. A fluid sensor, comprising:
   a microcontroller;
   a sensing unit communicatively coupled to the microcontroller, the sensing unit including a driving element and a sensing element, the sensing unit further comprising:
      a fluid conduit;
      a first bobbin surrounding the fluid conduit and at least one first coil disposed on the outer surface of the first bobbin;
      a second bobbin surrounding the at least one first bobbin, and at least one second coil disposed on the outer surface of the second bobbin;
      a magnetic shield surrounding the second bobbin; and
      a bobbin assembly sleeve enclosing the magnetic shield, first bobbin, and second bobbin;
   wherein the microcontroller generates a signal to excite the driving element of the sensing unit and receives a signal from the sensing element of the sensor so as to perform a measurement of a complex impedance of a fluid;
   wherein the sensing unit is adapted to perform the measurement, the measurement being a magnetic induction spectroscopy (MIS) sweep of the fluid; and
   wherein a property of the fluid is determined based on the measurement, the property being an electromagnetic induction fingerprint of the fluid, based on impedance exhibited due to inductance of particles in the fluid, collected over the MIS sweep.

5. The sensor of claim 4, wherein the at least one first coil is the sensing element and the at least one second coil is the driving element.

* * * * *